(12) United States Patent
Volmer

(10) Patent No.: US 10,104,928 B2
(45) Date of Patent: Oct. 23, 2018

(54) HEADWEAR ACCESSORY MOUNTING CLIP AND SYSTEM

(71) Applicant: Volmer Enterprises, Inc., Loveland, CO (US)

(72) Inventor: Jason R. Volmer, Loveland, CO (US)

(73) Assignee: Volmer Enterprises, Inc., Loveland, CO (US)

( * ) Notice: Subject to any disclaimer, the term of this patent is extended or adjusted under 35 U.S.C. 154(b) by 0 days.

(21) Appl. No.: 15/463,416

(22) Filed: Mar. 20, 2017

(65) Prior Publication Data

US 2017/0208888 A1    Jul. 27, 2017

Related U.S. Application Data

(63) Continuation-in-part of application No. 14/921,719, filed on Oct. 23, 2015, now Pat. No. 9,596,926.
(Continued)

(51) Int. Cl.
*A42B 1/24* (2006.01)
*A45F 5/02* (2006.01)
(Continued)

(52) U.S. Cl.
CPC .................. *A42B 1/24* (2013.01); *A45F 5/02* (2013.01); *F16B 2/005* (2013.01); *F16B 2/22* (2013.01);
(Continued)

(58) Field of Classification Search
CPC .................. A45F 5/02; A45F 2005/025; A45F 2005/027; A45F 2005/028; Y10T 24/1394;
(Continued)

(56) References Cited

U.S. PATENT DOCUMENTS 5,822,636 A    10/1998 Cho
D411,220 S     6/1999 Surabian
(Continued)

FOREIGN PATENT DOCUMENTS

CN    203963452    11/2014
DE    2821442      11/1979
(Continued)

OTHER PUBLICATIONS

XCSource(R) 360 degree rotary backpack hat rec-mounts clip clamp mount for GoPro www.amazon.co.uk (available at least as early as Jul. 9, 2015).
(Continued)

*Primary Examiner* — Robert Sandy
(74) *Attorney, Agent, or Firm* — Don V. Kelly; Evans & Dixon, L.L.C.

(57) ABSTRACT

A clip for mounting devices on a hat brim includes a first and second panel. The panels are each resiliently connected to a nose portion and separated by a spacing that tapers to a contact point from the distal portions of the panels to their proximal portions. The second panel has a wedge-shaped portion in which the width of the panel increases from its distal end to its proximal end. The bottom surface of the first panel is concave. The top surface of the second panel is convex. The clip can include connecting structure at its proximal end to allow for the interchangeable attachment of mounting structure for a variety of accessory devices. The clip can also include a mount for holding a microphone or microphone jack to allow the clip to hold a microphone in electrical communication with a camera mounted to the clip.

19 Claims, 47 Drawing Sheets

Related U.S. Application Data

(60) Provisional application No. 62/323,882, filed on Apr. 18, 2016.

(51) Int. Cl.
   *F16B 2/00*      (2006.01)
   *F16B 2/22*      (2006.01)
   *H04R 1/08*      (2006.01)

(52) U.S. Cl.
   CPC .......... *H04R 1/08* (2013.01); *A45F 2005/025* (2013.01); *A45F 2005/027* (2013.01); *A45F 2005/028* (2013.01); *A45F 2200/0516* (2013.01); *A45F 2200/0533* (2013.01); *Y10T 24/1394* (2015.01)

(58) Field of Classification Search
   CPC .......... Y10T 24/1391; F16B 2/22; A42B 1/24; A42B 1/242; A42B 1/244; A42B 1/245
   See application file for complete search history.

(56) References Cited

U.S. PATENT DOCUMENTS

| | | |
|---|---|---|
| 6,247,205 B1 | 6/2001 | Damadian et al. |
| D451,939 S | 12/2001 | Roh |
| 8,602,662 B1 | 12/2013 | Mans |
| 8,857,775 B1 | 10/2014 | Clearman et al. |
| 8,979,398 B2 | 3/2015 | Han et al. |
| 9,033,596 B2 | 5/2015 | Samuels |
| 9,077,877 B2 | 7/2015 | Fountain |
| 2004/0008157 A1 | 1/2004 | Brubaker et al. |
| 2004/0165109 A1 | 8/2004 | Lee |
| 2008/0201862 A1 | 8/2008 | Menard-Flanagan |
| 2008/0295295 A1 | 12/2008 | Rogers |
| 2009/0190333 A1 | 7/2009 | Sohn |
| 2010/0226641 A1 | 9/2010 | Lowen |
| 2011/0192951 A1 | 8/2011 | Gooch |
| 2012/0050607 A1 | 3/2012 | Sims et al. |
| 2015/0143669 A1* | 5/2015 | Pereira .................. A42B 1/24 24/3.12 |
| 2015/0172538 A1 | 6/2015 | Nordstrom et al. |
| 2015/0177597 A1 | 6/2015 | Harrison et al. |

FOREIGN PATENT DOCUMENTS

| | | |
|---|---|---|
| GB | 2489689 | 10/2012 |
| WO | WO2014114765 | 7/2014 |
| WO | WO2014184475 | 11/2014 |

OTHER PUBLICATIONS

Shill swivel clip mount for GoPro www.bhphotovideo.com (available at least as early as Jul. 11, 2015).
Professional 360 degree rotary backpack camera bag rucksack cap rec-mounts versatile clip fast clamp mount for Gopro Hero 2 3 3' www.amazon.co.uk (available at least as early as Jul. 9, 2015).
GoPro Jaws: flex clamp mount—Eastern Mountain Sports www.ems.com (available at least as early as Jul. 14, 2015).
GoPro—Head Strap+Quickclip-camera head mount http://shop.gopro.com (available at least as early as Dec. 4, 2013).
Hatcams one size hat with universal camera mount www.amazon.com (available at least as early as Jul. 9, 2015).
Quick clamp snap pinch hat cap clip bullet camera mount for Vio POV POV1 www.ebay.com (available at least as early as Jul. 12, 2015).
Replay XD hat visor cap lapel baseball clip tilt shoulder mount—SC-RPHM http://stuntcams.com (available at least as early as Jul. 12, 2015).
Spypoint XHD-CM—Cap Mount www.spypoint.com (available at least as early as Oct. 4, 2015).
Shimano Sports Camera mounts www.shimano-sportcamera.com/us/accessory.php (available at least as early as Jul. 13, 2015).
Stealth Cam EPIC hat clip mount: sports & outdoors www.amazon.com/Stealth-Cam-EPIC-Clip-Mount/dp0B001M57HAS (available at least as early as Oct. 4, 2015).
Hat/Visor clip for small action video camera, ActionCam (magnetic mount) http://ped-products.com/index.php?dispatch=products.view &product id=175 (available at least as early as Oct. 4, 2015).
Looxcie ball cap clip LM-0003-00 B&H photo video www.bhphotovideo.com (available at least as early as Oct. 4, 2015).
Looxcie HD: NEXX http://item.rakuten.co.jp/nexx-mart/lx-hd-jp (available at least as early as Oct. 4, 2015).
Point hat clip/Princeton Tec http://princetontec.com/point-hat-clip (available at least as early as Oct. 11, 2015).
Streamaroo hat tripod and mount adaptor www.streamaroo.com (available at least as early as Jul. 9, 2015).

\* cited by examiner

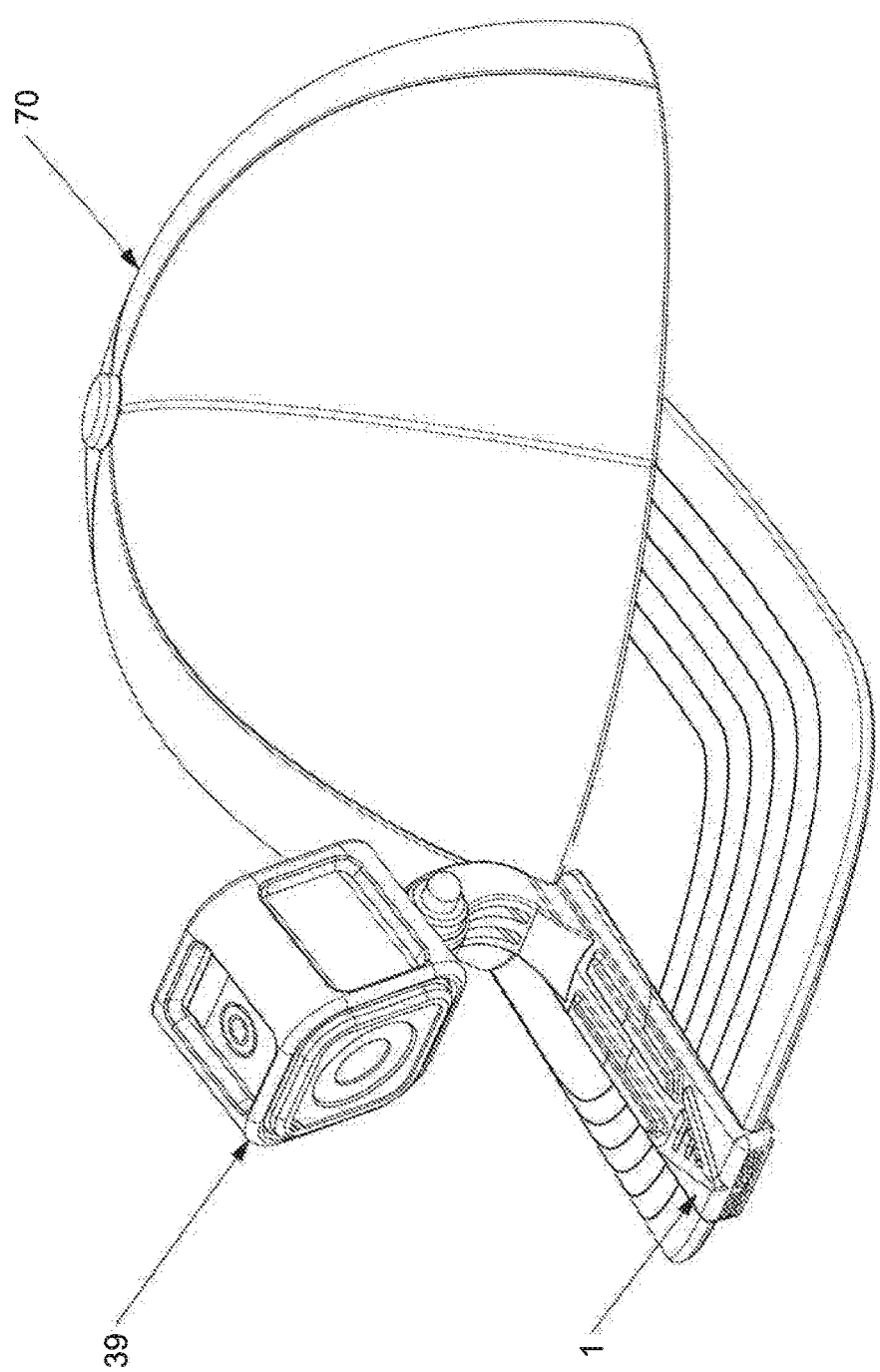

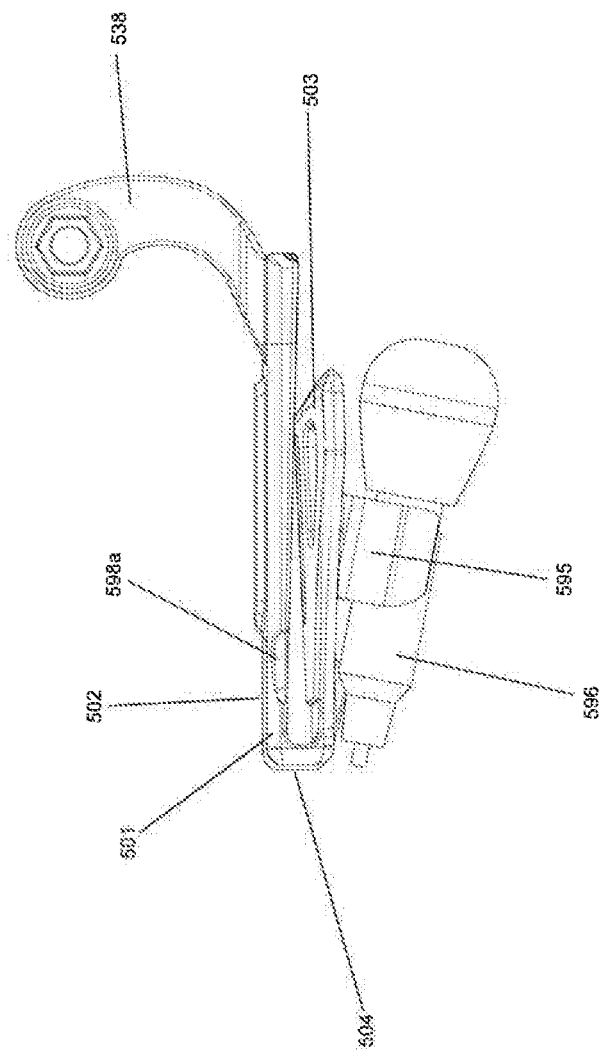

HEADWEAR ACCESSORY MOUNTING CLIP AND SYSTEM

This application is a continuation in part of U.S. patent application Ser. No. 14/921,719 filed on Oct. 23, 2015, now U.S. Pat. No. 9,596,926, the entire contents of which application are incorporated herein by reference. This application also claims the benefit and fully incorporates by reference the disclosure and contents of U.S. Provisional Patent Application No. 62/323,882.

STATEMENT REGARDING FEDERALLY SPONSORED RESEARCH OR DEVELOPMENT

Not applicable.

SEQUENCE LISTING, TABLE OR COMPUTER PROGRAM ON COMPACT DISC

Not applicable.

FIELD OF INVENTION

This invention relates generally to accessory mounts and more specifically to those mounts intended for attachment to headwear.

BACKGROUND OF THE INVENTION

The deployment of a headlamp positioned in the vicinity of a user's forehead is a long-known technique to provide hands free lighting when needed. One technique for deploying such hands-free lighting is to attach a headlamp to elastic bands that can circumscribe a user's head or helmet. An exemplary prior art accessory mounting hand is shown in FIG. 11A. The elastic bands retain the light or lamp against the forehead while the user engages in a desired activity. This elastic band technique has also been used for deploying small, point-of-view cameras, such as the Go-Pro brand camera, on a user's head, hat or helmet. Many users eschew the elastic band mounts because of a variety of reasons, including vanity and discomfort.

Other techniques for deploying an accessory such as a light or point of view ("POV") camera involve attaching a mounting apparatus that is adapted to receive the light or camera to a baseball cap. The currently available mounts intended to attach to a baseball cap come in a variety of structural configurations. They all, however, suffer from a wide array of deficiencies. For example, one style of mount requires that the brim or bill of the hat be pierced. This prior art technique is shown in FIG. 11B. In this style mount, the accessory-receiving portion of the mount attaches to a post that pierces through the hat's brim. This type mount is undesirable because it physically deforms the subject cap in permanent fashion. Also, the hole through which the post is pierced can loosen with time, causing the mount to undesirably shake and wobble.

Other accessory mounts intended for attachment to the brim of a hat are known as well. Some mounts use an alligator clip arrangement that clips to the bill of a cap. With this type of mount, the alligator clip slides over the front of the cap bill and holds an accessory device either above or below the bill. An example of this prior art device is shown in FIG. 11C. The prototypical alligator clip is formed from two panels that are connected by a metal spring. The spring is positioned between the two panels and near one end of them. The interpositioned spring biases the panels so that their ends opposite the spring are forced into contact with each other. The inner surfaces of the panels are serrated in some form, assumedly on the assumption that such serration enhances the ability of the clip to grip whatever structure (e.g., cap bill) inserted between the two panels. Alligator clip mounts have several deficiencies which make their performance less than desirable for use with accessory devices. In one instance, the alligator clip is bulky and its portion that is positioned underneath the bill will provide a visual distraction or obstruction. Secondly, this type of clip focuses its gripping force and brim contacting surfaces at one end of the clip—the end not localized at the cap brim edge. As a result, alligator clip type mounts do not provide sufficient grip to keep a heavier device like a POV camera in place when the user is involved in any type of vigorous activity. During such activity the clip tends to slide transversely along the brim front causing the camera angle to change.

Some bill accessory mounts utilize as their bill attachment mechanism a molded plastic clip or formed metal clip. In contrast to the alligator clip mount that uses the three of a metal spring to urge the panels to a point of contact, this type of clip eschews the metal spring in favor of integrally molded or formed rigid panels resiliently connected at a meeting point. The clip attaches to a cap bill simply by pushing the cap bill between the clip's panels. Examples of this type of prior art mounting clip are shown in FIGS. 11D-11G. These types of clips are intended to hold onto the cap bill through some level of friction between the clip panels and the inserted bill. At best, these slip-on plastic or metal mounting clips work well with small, lightweight devices, like mini-LED lights, that mount below the brim of a cap (FIG. 11D)). The currently available versions do not work well with heavier devices like POV cameras. In this respect the clips tend to slide across and off the cap bill because they: a) do not create enough clamping force with the bill; b) do not provide for sufficient frictional contact with the bill; or both. As a result, a user deploying one of the molded plastic or formed metal clips must restrict and monitor his or her physical movements so as not to move too violently and cause the POV camera to move or fall off the cap.

SUMMARY OF THE INVENTION

The preferred embodiment clip overcomes the deficits of the prior art and allows for the secure mounting of accessory devices on a hat brim. The device works particularly well when used to mount accessories on the brim (a/k/a bill) of a baseball cap. Such a brim typically has a front edge that has an edge ("front-to-back") curvature of certain radius. The brim also has a thickness. The brim also has a transverse curvature (also known as a "bend") of a certain radius. The preferred embodiment clip adapted for attachment to such a brim comprises a first (top) panel and a second (bottom) panel. The first and second panels respectively have a length, a width, a top surface, a bottom surface, a proximal end and a distal end.

The first panel and second panel each resiliently connect at their distal ends in general perpendicular fashion to a nose segment. The top of the nose segment is connected to the distal end of the first panel. The bottom of the nose segment is connected to the distal end of the second panel. The nose segment has a front-facing (outer) surface and a brim-facing (inner) surface. The top (outer) surface of the first panel includes mounting structure adapted (sized and shaped) to receive an accessory device such as a light or POV camera.

This mounting structure is positioned on the first panel at the proximal end to ergonomically balance the mounted accessory.

Importantly and in contra-distinction to the prior art, the second panel has a wedge-shaped portion in which the width of the panel increases from the distal end of the panel to the proximal end of the panel. This allows the bottom of the clip to cut into and frictionally engage the bottom of the hat brim due to the transverse radius of the hat brim. This frictional engagement increases the purchase of the clip against the hat brim.

Also adding to the friction-creating contact between the preferred embodiment clip and hat brim is the fact that the clip has a plurality of convex and concave surfaces. For example, in the preferred embodiment, the bottom (inner) surface of the first panel is concave. This concavity has a radius closely equal to that of the transverse curvature of the brim. This allows for increased surface contact with the top of the hat brim and hence an increased frictional hold. A second friction augmenting feature is the shape of the second panel. In this respect, the top surface of the second panel is convex. The convexity has a radius closely equal to that of the transverse curvature of the brim. A third friction augmenting feature is built into the nose segment, which in the preferred embodiment has a plurality of concave surfaces that can mirror both the edge curvature and transverse curvature of the typical baseball cap. For example, in the preferred embodiment, the intermediate brim-facing surface of the nose segment is concave and the concavity closely approximates that of the edge curvature of the hat brim. Additionally, at the distal end of the second panel, the top surface of the second panel includes a channel. This channel too can have a convex floor and sidewall. This channel serves to gather the stitched border of fabric that is found on the undersurface of the brim about the brim's perimeter. By receiving this fabric, the brim-holding ability of the clip is enhanced.

The design of the inventive clip also has beneficial application as the foundation for a clip or clip system that allows for interchangeable attachment of end-pieces that can accommodate a variety of device mounting structures. This is done via an inventive system in which a clip body meeting the design of the above-described clip includes at its proximal end structure to releasably engage interchangeable end-pieces that each include a different accessory device mounting support. The system thus could include a plurality of end-pieces each directed to an accessory device having a different type of mounting structure. The system could also include a plurality of end-pieces directed to the same accessory (i.e., the same accessory mounting structure), but each end-piece has mounting structure of different physical characteristics, such as tall, short, offset to the left or offset to the right. In another embodiment, the design of the present invention clip and systems using a similarly structured clip body can be adapted to include a mount for holding a microphone or microphone jack (collectively referred to as a "microphone/jack"). The invention is also directed to an inventive system in which a clip body meeting the design of the above described clip releasably engages an insert that can be used to reduce the vertical spacing between the top and bottom panels of the clip body to allow the clip body to be used on brims of varying thicknesses. The system can include one or more interchangeable inserts of varying thicknesses, textures and size.

BRIEF DESCRIPTION OF THE DRAWINGS

FIG. 16 depicts an embodiment of the present invention clip with a POV camera mounted to it, the clip being attached to a baseball cap.

FIG. 27 is a right elevation view of an alternative embodiment clip including a mount sized and shaped to releasably hold a microphone/jack in electrical communication with an accessory device mounted to the clip.

DETAILED DESCRIPTION

A preferred embodiment of the present invention accessory mounting clip 1 and its preferred constituent features are shown in FIGS. 1-10, FIGS. 13A-13D and FIGS. 14-17. For reference purposes the term "distal end" is used to refer to that portion of the clip or its components that are furthest away from a user's head when the clip is deployed on the brim of a hat. The term "proximal end" is used to refer to that portion of the clip or its components that are nearest the user's head when the clip is deployed on the brim of a hat. The preferred embodiment clip works particularly well when used to mount accessories on the brim (a/k/a bill) 71 of a baseball cap 70 such as is shown in FIGS. 12A and 12B.

Figure 12A:
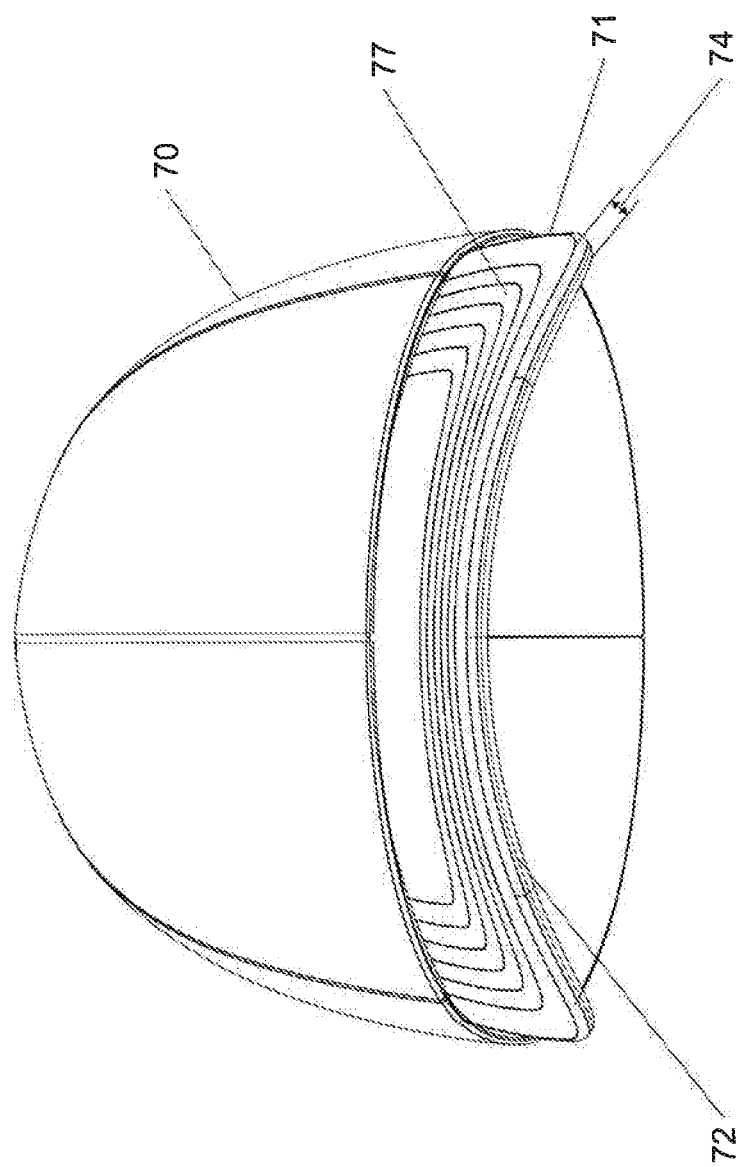
FIGS. 12A-12B depict a typical baseball cap upon which the present invention clip may be attached.
Figure 12B:
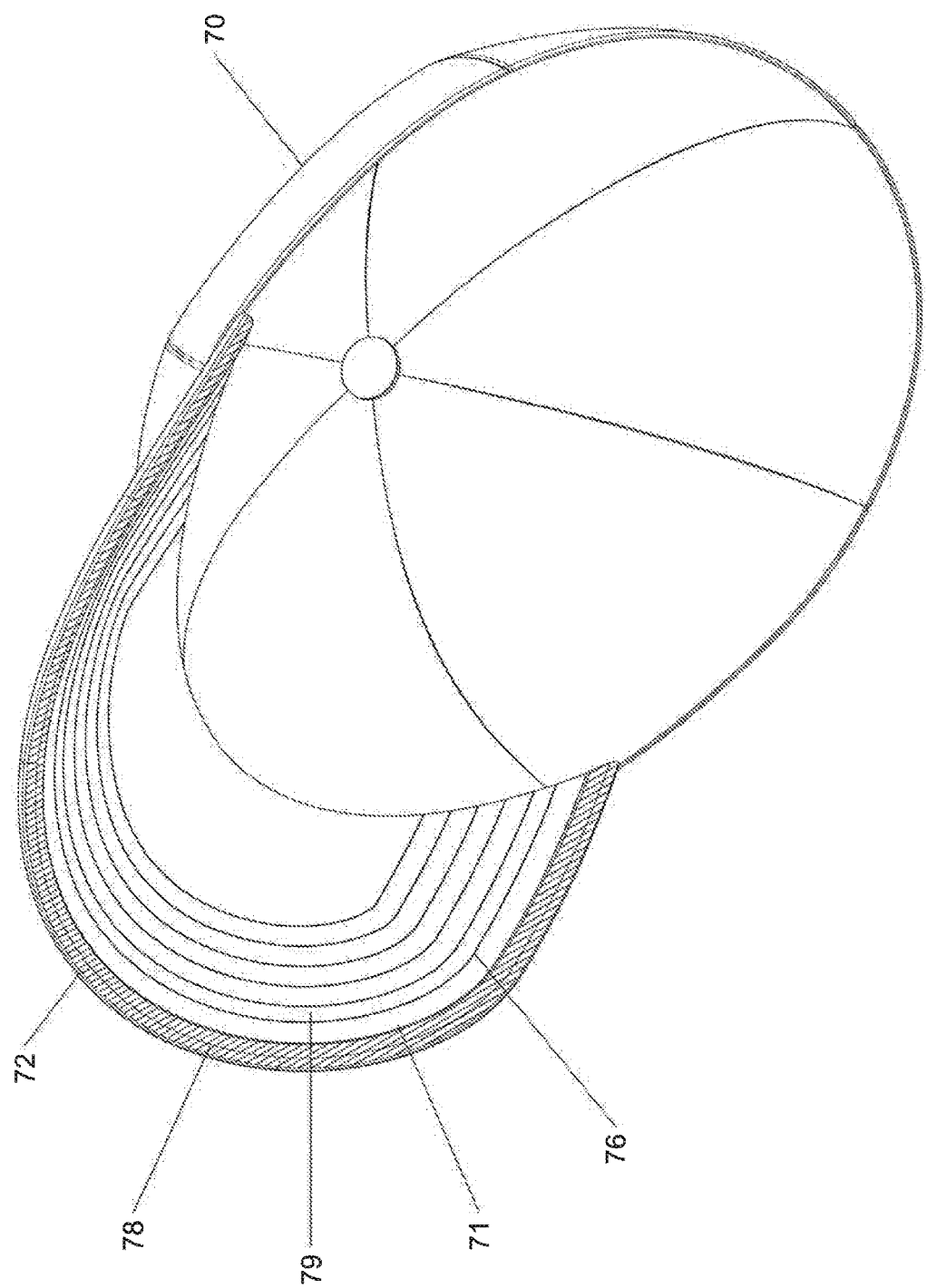
Figure 13A:
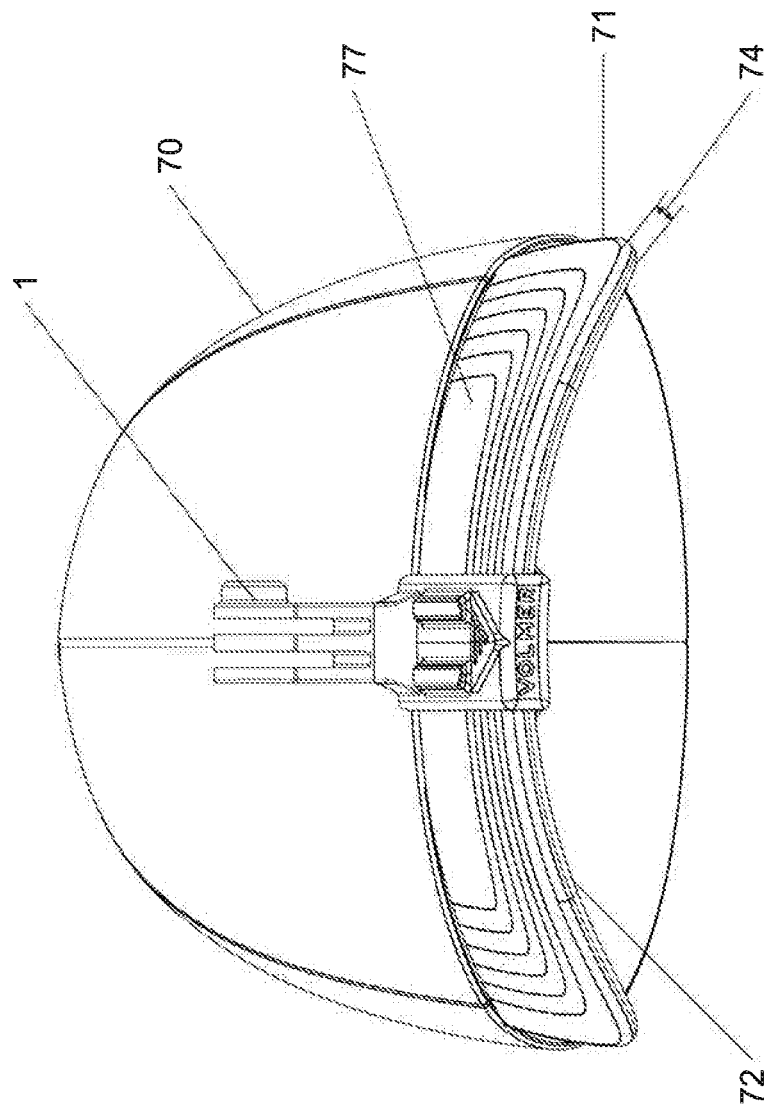
FIGS. 13A-13D depict a preferred embodiment of the present invention clip mounted to the brim of a baseball cap.
Figure 13B:
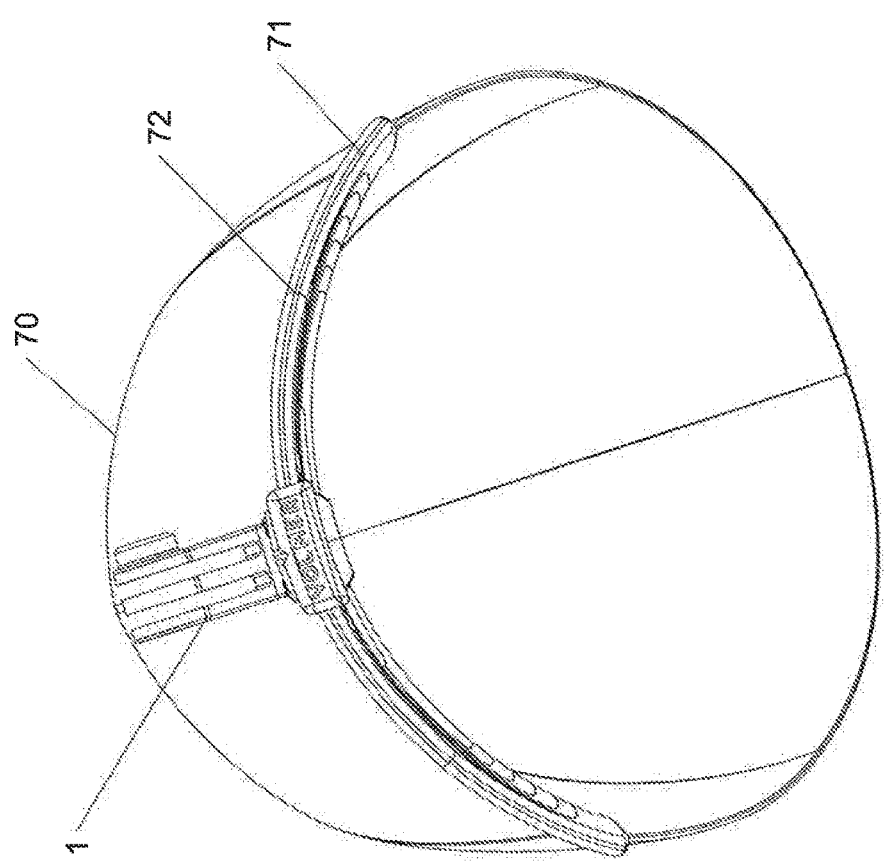
Figure 13C:
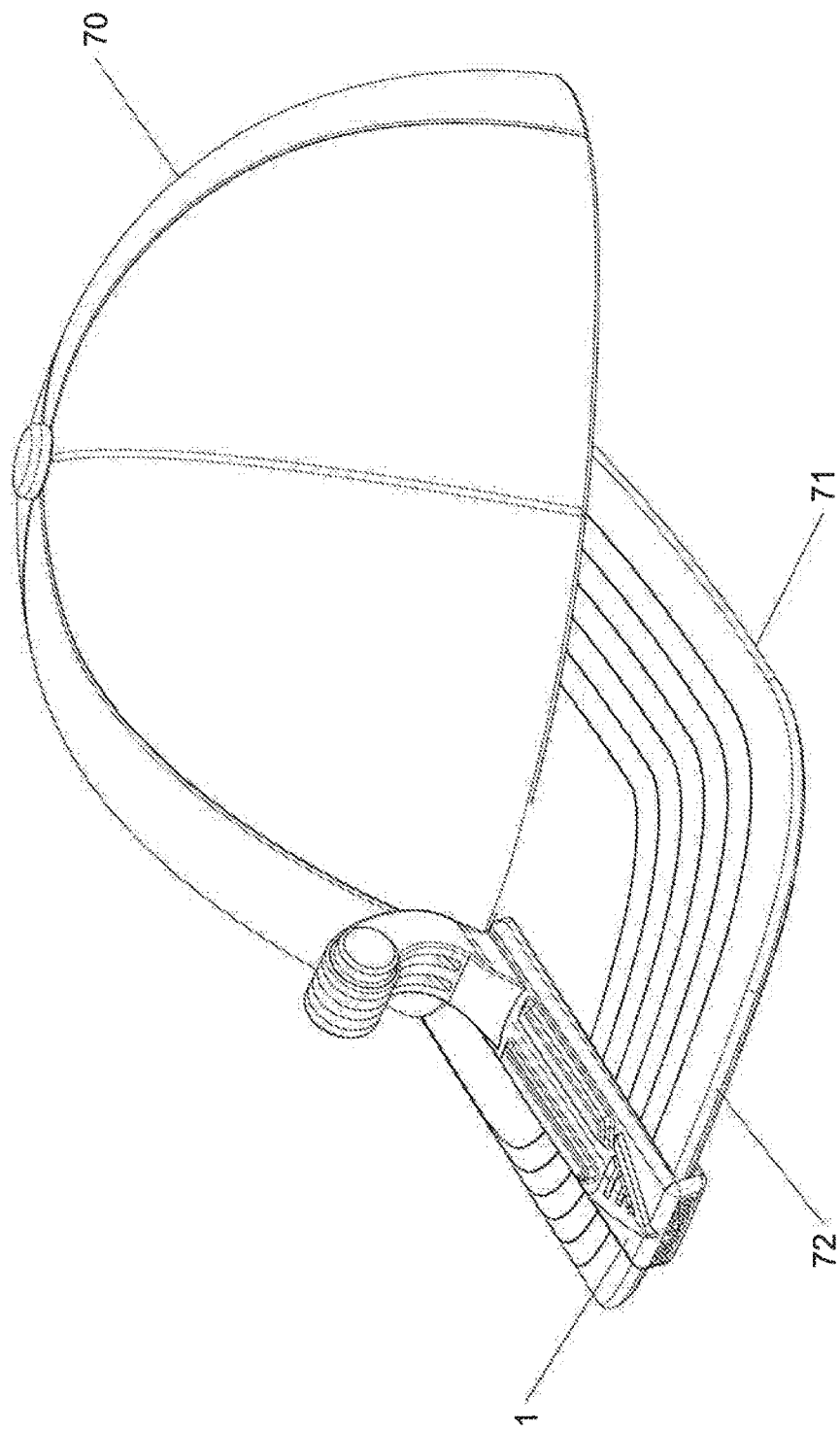
Figure 13D:
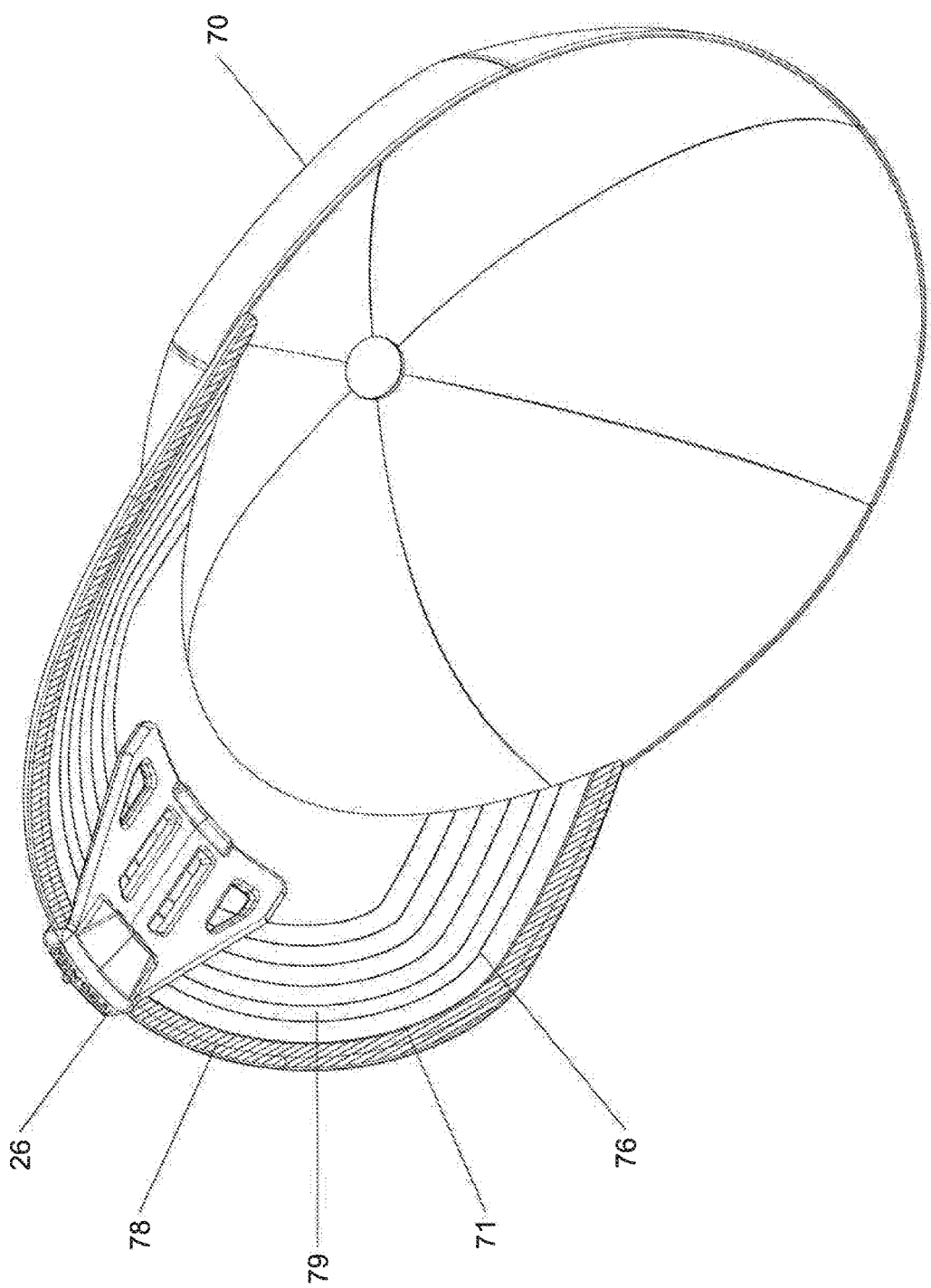
Figure 14:
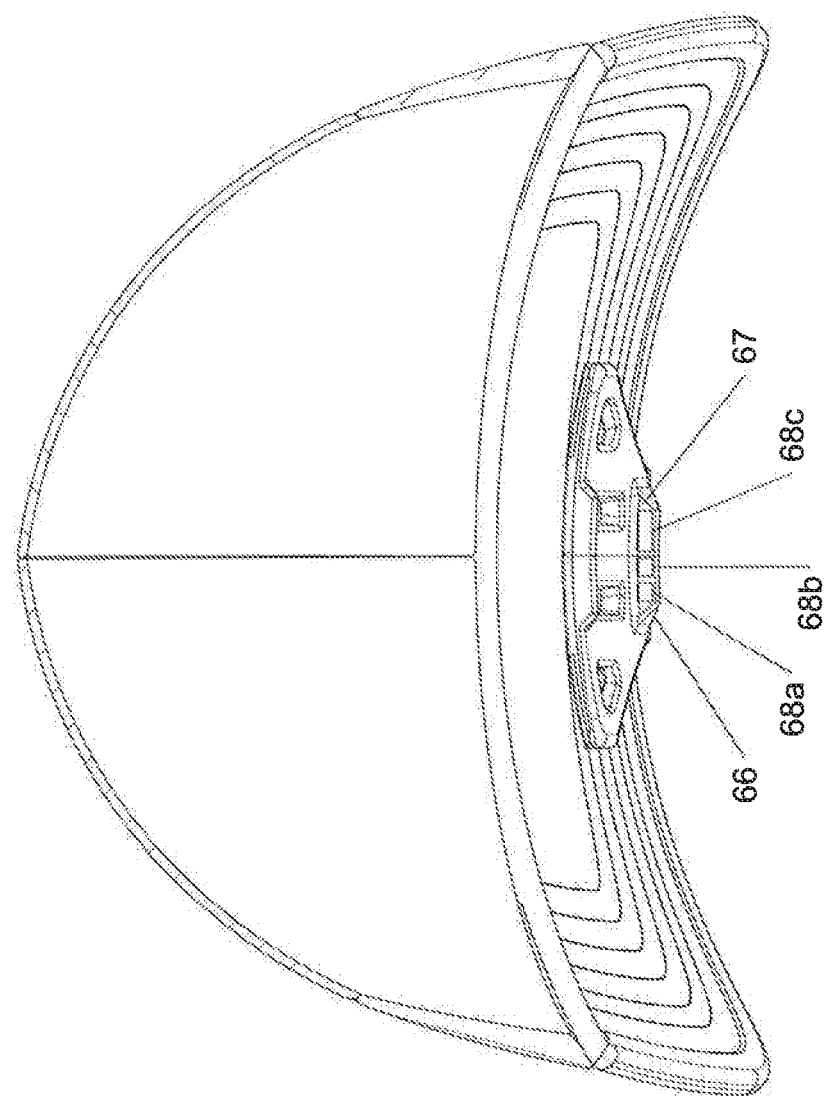
FIG. 14 depicts an embodiment of the present invention clip having a thumb tab that includes an indicator display that alerts the user to an operational status of a mounted accessory device.

As shown in FIGS. 12A and 12B, brim 71 typically has a front edge 72 that has a front to back curvature of certain radius. Brim 71 also has a thickness 74. Brim 71 also has a transverse curvature or bend of a certain radius that is best discerned when looking at the cap head on.

As shown by the figures, clip 1 is springless, which distinguishes the clip from the alligator clip style mounting clips. Preferred embodiment clip 1 is sized and shaped to attach to brim 71 by way of a pair of pinching panels 2, 3 between which brim 71 is inserted. Accordingly, clip 1 comprises a first panel 2 and a second panel 3. In common usage, first panel 2 is an upper (top) panel and second panel 3 is a lower (bottom) panel. First panel 2 and second panel 3 define space 80 into which a brim is inserted. First panel 2 and second panel 3 respectively have a length 7, 14, a width 8, 15, thickness 9, 16, a top surface 10, 18, a bottom surface 11, 17, a proximal end 6, 13 and a distal end 5, 12.

First panel 2 and second panel 3 each resiliently connect at their distal ends 5, 12 to nose segment 4. Nose segment 4 comprises a front facing (outer) surface 26 and a brim facing (inner) surface 27. Top 19 of nose segment 4 connects to distal end 5 of first panel 2. Bottom 20 of nose segment 4 connects to distal end 12 of second panel 3. Proximal end 13 of second panel 3 may be chamfered to better guide brim 71 into space 80 between panels 2, 3. Front facing surface 26 may include a logo or brand name 41 printed or embossed thereon Likewise, distal end 3 of panel 2 may also include a logo or brand name 41 printed or embossed thereon.

Importantly and in contra-distinction to the prior art, second panel 3 has a wedge-shaped (a/k/a "delta-shaped") portion 52 in which the width 15 of panel 3 increases from its distal end 12 to its proximal end 13. In the preferred embodiment, wedged-shaped portion 52 is formed by a pair of flaring side segments 21, each of which leads into a distal segment 22. In the preferred embodiment distal segments 22 are parallel to each other.

The angular arrangement of side segments 21 with distal segments 22 of wedge-shaped portion 52 of lower panel 3 create fabric-catching edges 64 that are forced into the relatively softer cloth surface of brim bottom surface 76 when clip 1 is deployed on a brim 71. In the preferred embodiment, distal segments 22 meet flaring side segments 21 at an obtuse angle. Edges 64 allow second panel 3 of clip 1 to cut into and frictionally engage the bottom 76 of hat brim 71 due to the transverse curvature of brim 71. This frictional engagement increases the purchase of clip 1 against hat brim 71.

As seen in the figures, first panel 2 and second panel 3 adjoin nose segment 4. First panel 2 and second panel 3 are separated along almost their entire lengths by vertical space 80. At the distal end of clip 1, the height of vertical spacing 80 between first panel 2 and second panel 3 is roughly equal to thickness 74 of hat brim 71. As one moves from the distal end of clip 1 to its proximal end, spacing 80 decreases until panels 2, 3 make contact. Preferably, proximal end 13 of second panel 3 will touch panel 2 at a point about 75% of its length as measured from distal end 5. This decrease in spacing between panels 2, 3 increases frictional purchase of clip 1 against brim 71. The resilient connection of panels 2, 3 to nose segment 4 allows spacing 80 at the proximal end of clip 1 to increase via resilient deflection so as to receive a hat brim 71.

Figure 17:
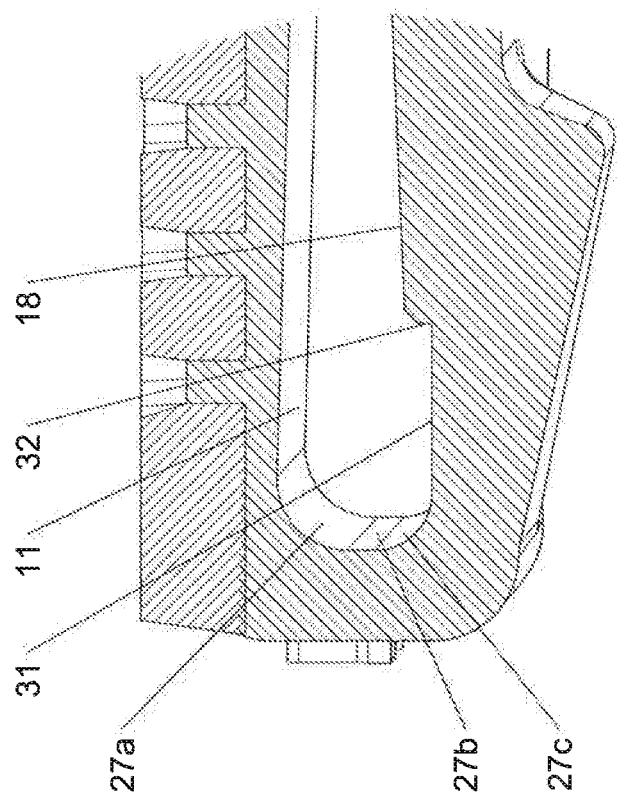
FIG. 17 is a detailed view of the distal area of the clip shown in section view in FIG. 7. The detailed area shows the channel and various convex and concave surfaces that can be included as part of the invention.
Figure 18:
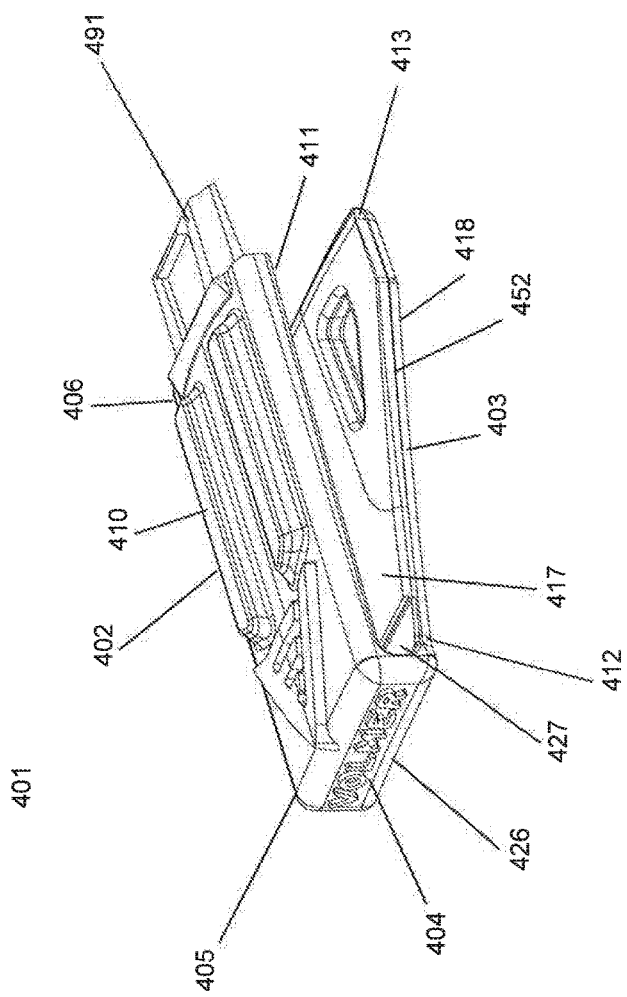
FIG. 18 is a perspective view of an embodiment clip body including structure at its proximal end for interchangeable attachment of end-pieces that can accommodate a variety of device mounting structures.
Figure 19:
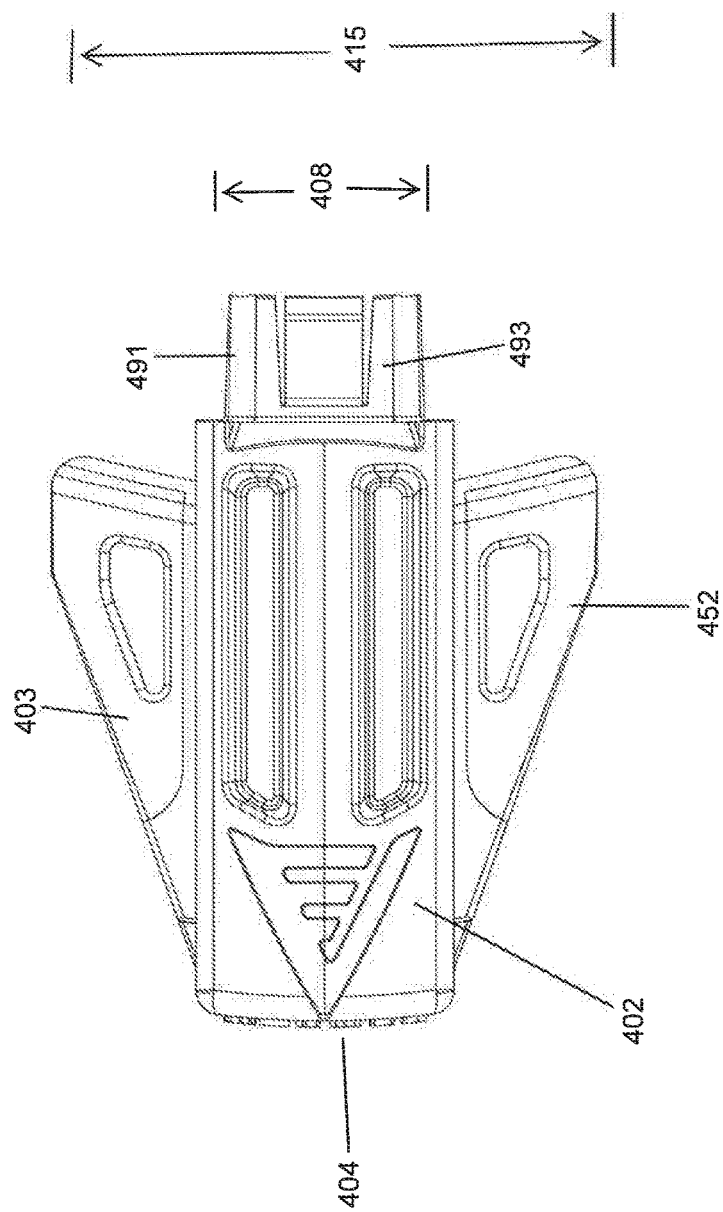
FIG. 19 is a top plan view of an embodiment clip body including structure at its proximal end for interchangeable attachment of end-pieces that can accommodate a variety of device mounting structures.
Figure 20:
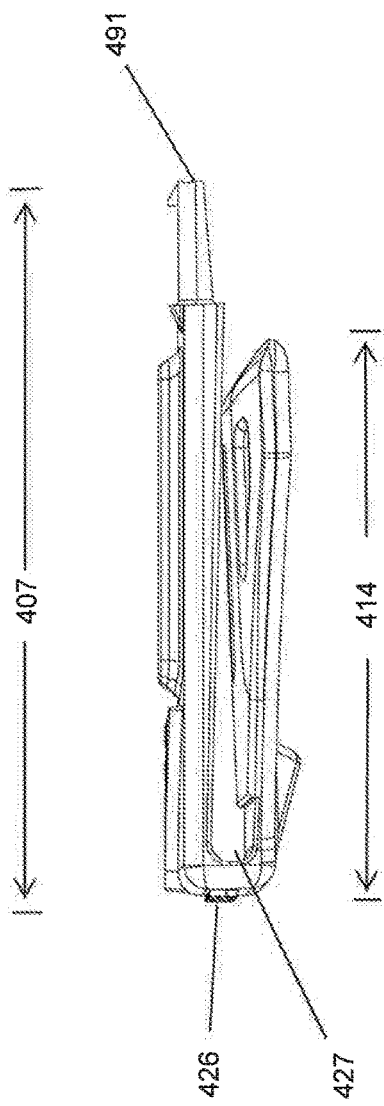
FIG. 20 is a right elevation view of an embodiment clip body including structure at its proximal end for interchangeable attachment of end-pieces that can accommodate a variety of device mounting structures.
Figure 21:
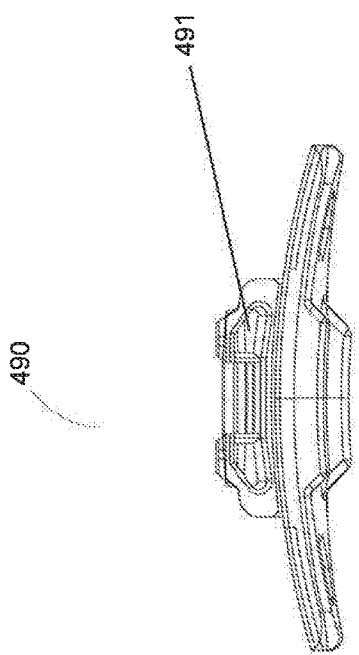
FIG. 21 is a rear elevation view of an embodiment clip body including structure at its proximal end for interchangeable attachment of end-pieces that can accommodate a variety of device mounting structures.
Figure 22:
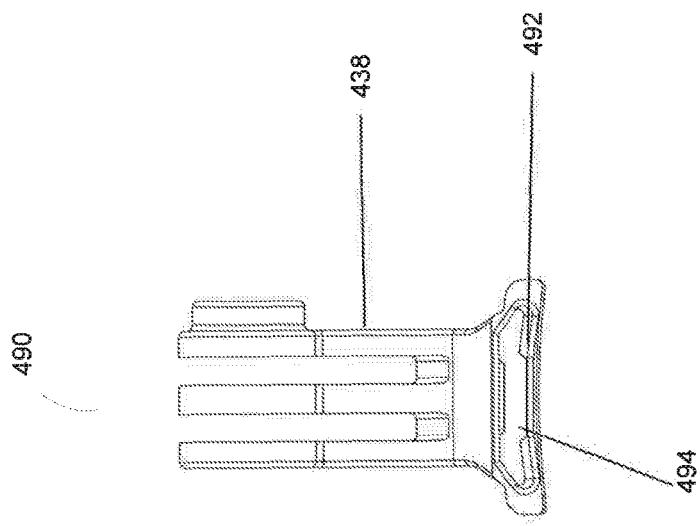
FIG. 22 is a front elevation view of an embodiment end-piece sized and shaped for interchangeable attachment to the proximal end of the clip body shown in FIGS. 18-21.
Figure 23:
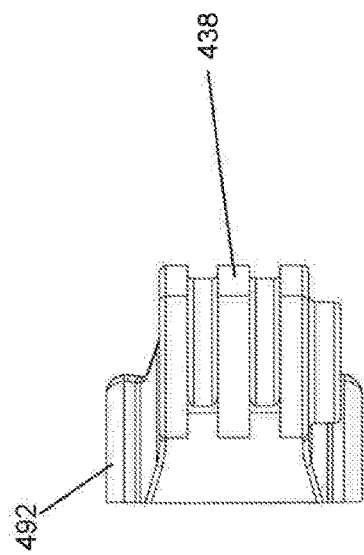
FIG. 23 is a top plan view of an embodiment end-piece sized and shaped for interchangeable attachment to the proximal end of the clip body shown in FIGS. 18-21.
Figure 24:
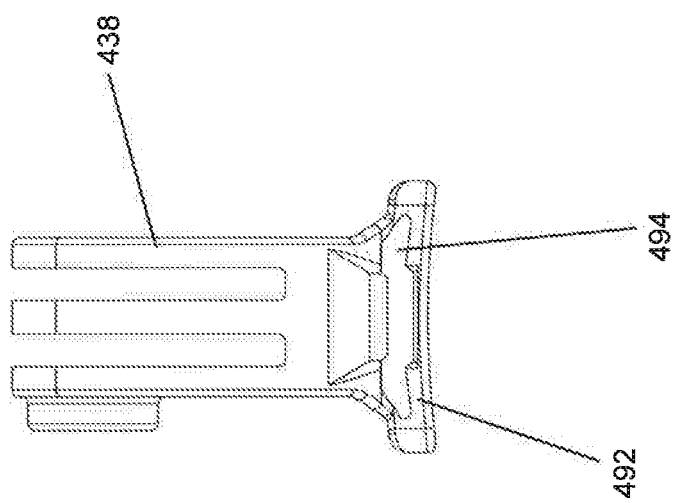
FIG. 24 is a rear elevation view of an embodiment end-piece sized and shaped for interchangeable attachment to the proximal end of the clip body shown in FIGS. 18-21.
Figure 25:
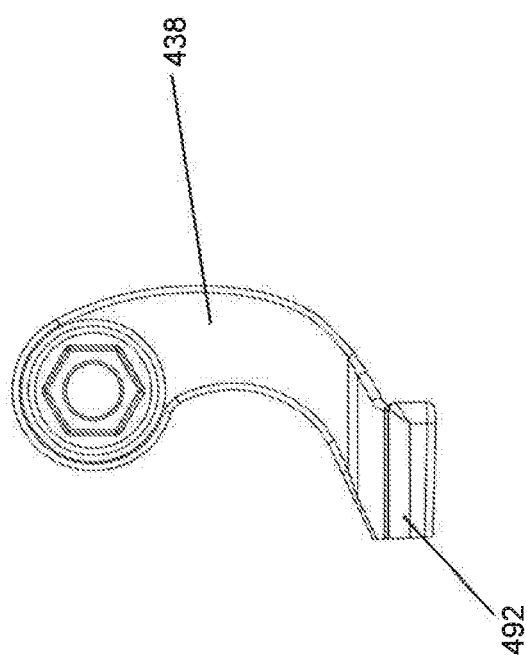
FIG. 25 is a right elevation view of an embodiment end-piece sized and shaped for interchangeable attachment to the proximal end of the clip body shown in FIGS. 18-21.
Figure 26:
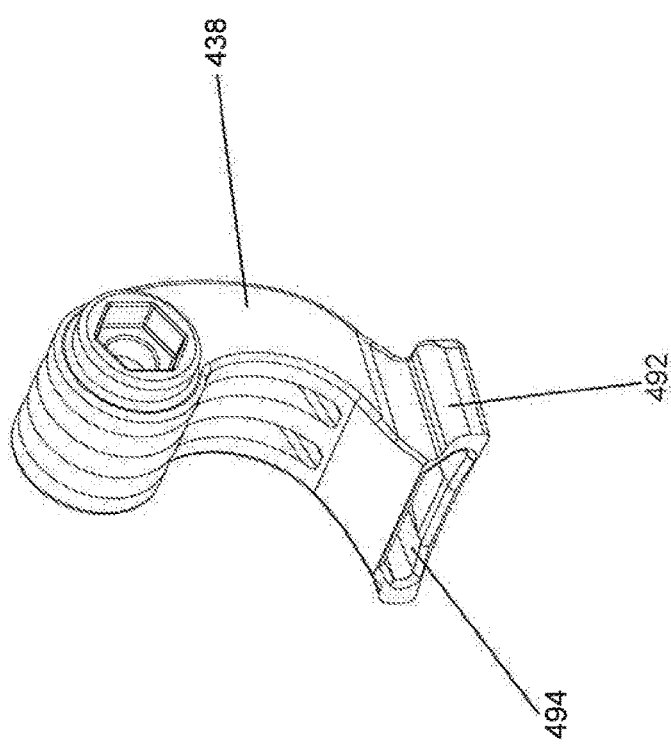
FIG. 26A is a perspective view of an embodiment end-piece sized and shaped for interchangeable attachment to the proximal end of the clip body shown in FIGS. 18-21.
FIG. 26B is a perspective view of an embodiment system comprising a clip body and end-piece exemplarily deploying a light.
FIG. 26C is a perspective view of an embodiment system comprising a clip body and end-piece exemplarily deploying a POV camera.
Figure 26B:
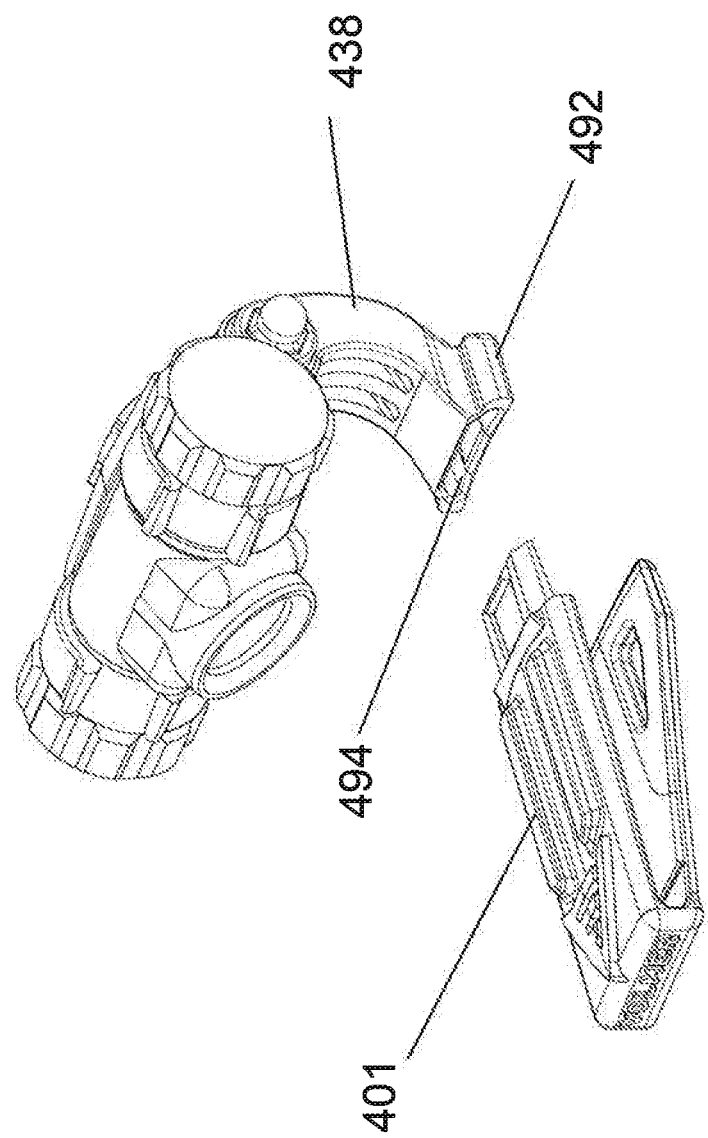
Figure 26C:
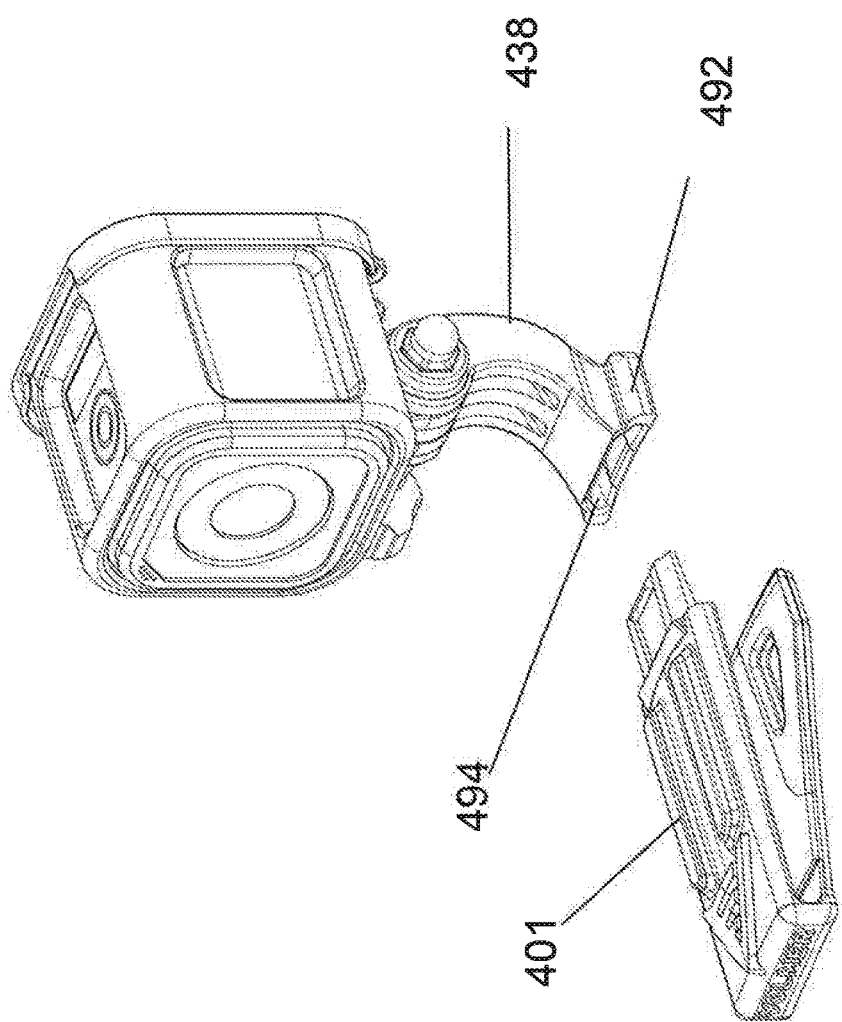
Figure 28:
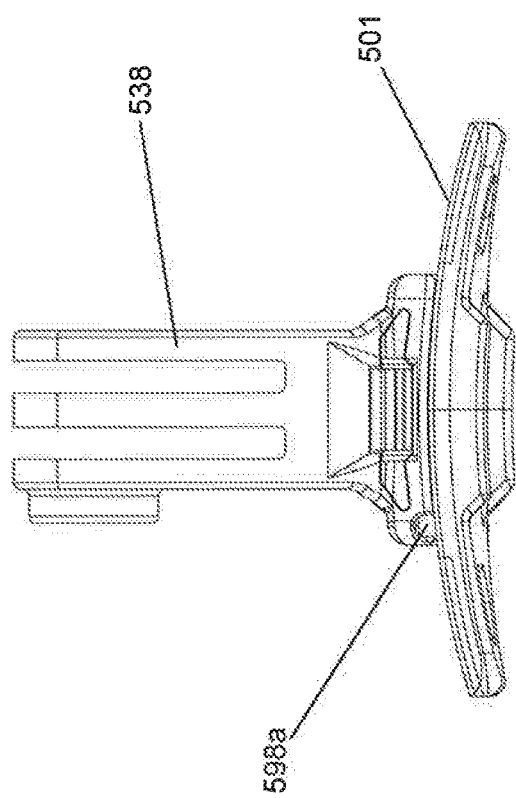
FIG. 28 is rear elevation view of an embodiment system showing an end-piece attached to a clip body, the clip body having an integrated channel sized and shaped to hold a wire extending from a microphone/jack mounted to the clip to a device mounted on the clip.

Also adding to the friction-creating contact between clip 1 and hat brim 71 is the fact that the clip can have one or more concave and convex surfaces that increase surface contact between the clip and hat brim. For example, as shown in the figures, bottom surface 11 of first panel 2 is concave. In the preferred embodiment, this concavity has a radius closely equal to that of transverse curvature of brim 71. This allows for increased surface contact between the top surface 77 of hat brim 71 and bottom surface 11 of panel 2 and hence an increased frictional hold. This increased frictional hold is augmented by the shape of second panel 3. In this respect, as shown in the embodiment shown in the figures, top surface 18 of second panel 3 is convex. The convexity preferably has a radius closely equal to that of transverse curvature of brim 71. This convexity may also be found in floor 31 of channel 30. Additionally, as best shown in FIG. 17, brim-facing, inner surface 27 of nose segment 4 may be concave in one or more dimensions. For example, constituent portions 27a, 27b and 27c may have a front-to-back concavity that more preferably mirrors that of the edge curvature of edge 72. Constituent portions 27a, 27b and 27c may also have a vertically oriented curvature to better receive the vertical curvature of brim edge 72. It is intended that these concave portions of nose 27 increase purchase against brim edge 72. Also, channel sidewall 32 is preferably formed in convex fashion to increase the hold of fabric border 79.

Preferred embodiment clip 1 includes cutouts 42 formed in proximal end 13 of second panel 3. Cutouts 42 reduce weight and allow proximal end 13 of panel 3 to flex more in relation to its distal end 12. This increased flexibility allows panel 3 to conform to the curvature of under surface 76 of brim 71 thereby increasing surface to surface contact between the clip and the hat brim.

As seen in the figures, top surface 10 of first panel 2 includes mounting structure 38 adapted (sized and shaped) to receive an accessory device such as a light or POV camera. Mounting structure 38 may be integrally formed in first panel 2 as shown in the figures or may be mechanically attached. Mounting structure 38 of preferred embodiment clip 1 shown in the figures is particularly adapted to receive the mounting structure of a GoPro brand POV camera. Other mounting structures may be used. Unlike some prior art accessory mounting devices that place the mounting structure at the distal end of the device, mounting structure 38 of the present invention clip is positioned at the proximal end 6 of first panel 2.

Preferred embodiment clip 1 can include one or more enhancements to increase its brim-holding power. For example, all or part of top (inner) surface 18 of second, bottom panel 3 may be texturized to increase friction with bottom surface 76 of brim 71. Such texturizing can involve application of a rubberized surface to top surface 18. Alternatively or additively, top surface 18 may include a knurled surface, a roughened surface, a surface with upward facing micro-points or a surface with rough fibrous surface texture. By texturizing all or part of top surface 18 the coefficient of friction between clip top surface 18 and brim bottom surface 76 is increased. In addition, second panel 3 preferably becomes more flexible (compared to the distal portion) near the widest portions, which allows second panel 3 to better form to the curvature of brim 71.

In a preferred embodiment, the width of second panel 3 at its proximal end is 1.5 to 2.5 times the width of the first panel at its proximal end. Tests of various iterations of the inventive clip 1 have shown that clip 1 offers optimal frictional purchase against brim 71 when the width 15 of second panel 3 at its proximal end 13 is approximately 2 times the width 8 of the first panel 2 at its proximal end 6.

The shape and structure of nose segment 4 have been shown to also significantly increase the ability of clip 1 to resist movement on the bill of a conventional baseball cap. For example, nose segment 4 connects in general perpendicular relation to each of the first and second panels 2, 3. This allows front edge 72 of brim 71 to be pushed flush up against brim-facing surface 27 of nose segment 4. To further increase the frictional purchase of clip 1 on brim 71, distal end 12 of panel 3 includes a channel 30. Channel 30 has a floor 31 and a sidewall 32. Sidewall 32 rises to top surface 18 of second panel 3 at its distal end 12. The positioning of channel 30 relative to inner (brim-facing) surface 27 of nose portion 4 and the decreasing vertical space 80 between panels 2, 3 operate to force the proximal edge of fabric border 78 into sidewall 32, augmenting the frictional hold of the clip on brim 71. At the same time and also augmenting the frictional hold, brim edge 72 is forced into brim-facing surface 27.

The purpose of channel 30 will now be further explained. As seen in FIG. 12B, a typical brim of a baseball cap includes stitching 79 on the bottom surface 76 of brim 71. Stitching 79 defines a border 78 of cloth material between stitching 79 and brim front edge 72. This border 78 of cloth material (indicated by the cross-hatched area in FIG. 13D) typically has a width and an additional thickness. For a large amount of readily purchasable baseball caps, the width of cloth material border 78 falls within a range of 0.584 to 0.686 centimeters. Channel 30 is preferably sized to fall within that range. When clip 1 is fully seated on brim 71 such that brim edge 72 is in contact with brim-facing surface 27 of nose portion 4, border 78 of cloth material tends to drop in and be retained by sidewall 32 of channel 30. This retention of border material 78 by channel 30 increases the frictional hold clip 1 has on brim 70 particularly when channel 30 is constructed in the preferred embodiment as is immediately described. In this respect floor 31 of channel 30 connects to sidewall 32 in general perpendicular relation. Similarly, in the preferred embodiment sidewall 32 of channel 30 connects to panel 3 in general perpendicular relation at a corner 54. Corner 54 may include a bevel 55 to aid in insertion and removal of brim 71 from clip 1. Corner 54 digs into bunched fabric of border material 78 and assists in retaining clip 1 in a fixed position on brim 71.

Figure 1:
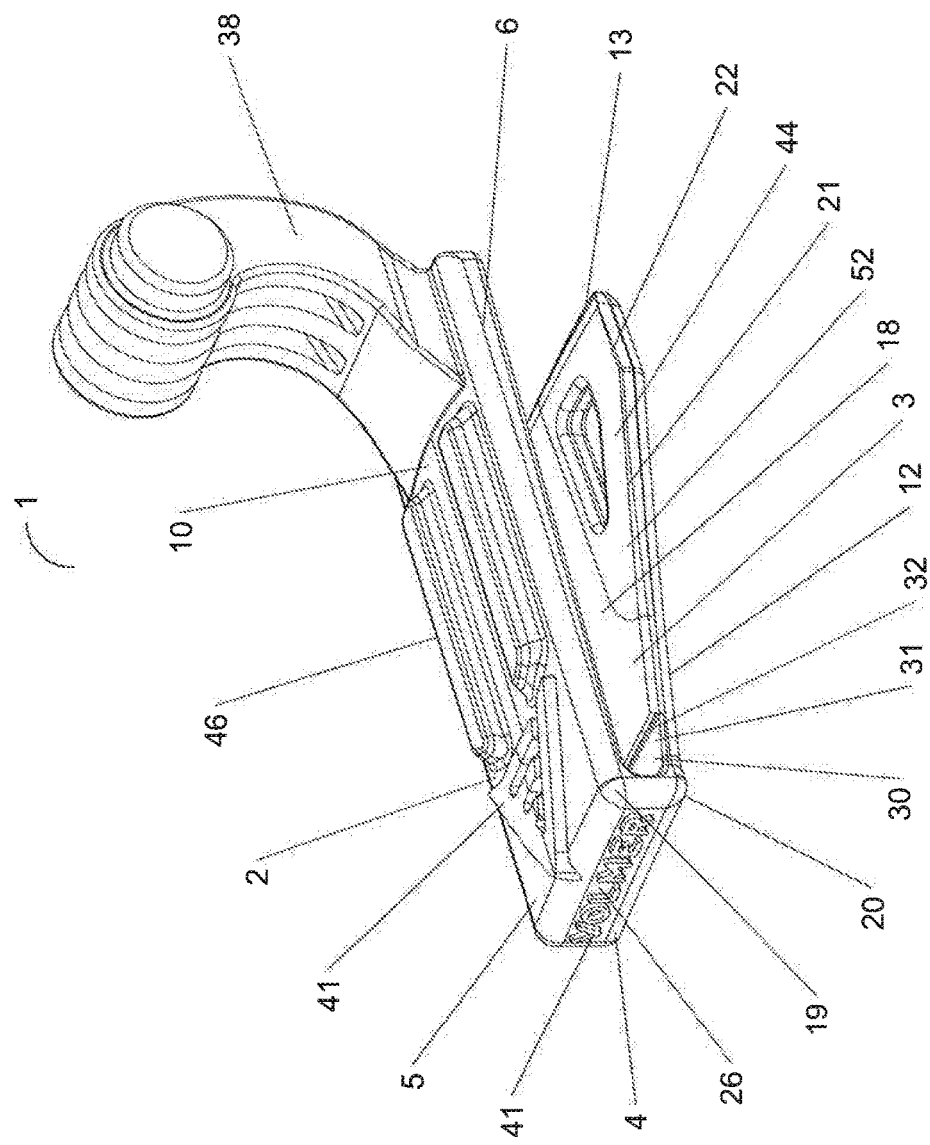
FIG. 1 is a front perspective view of a preferred embodiment of the accessory mounting clip of the present invention.
Figure 2:
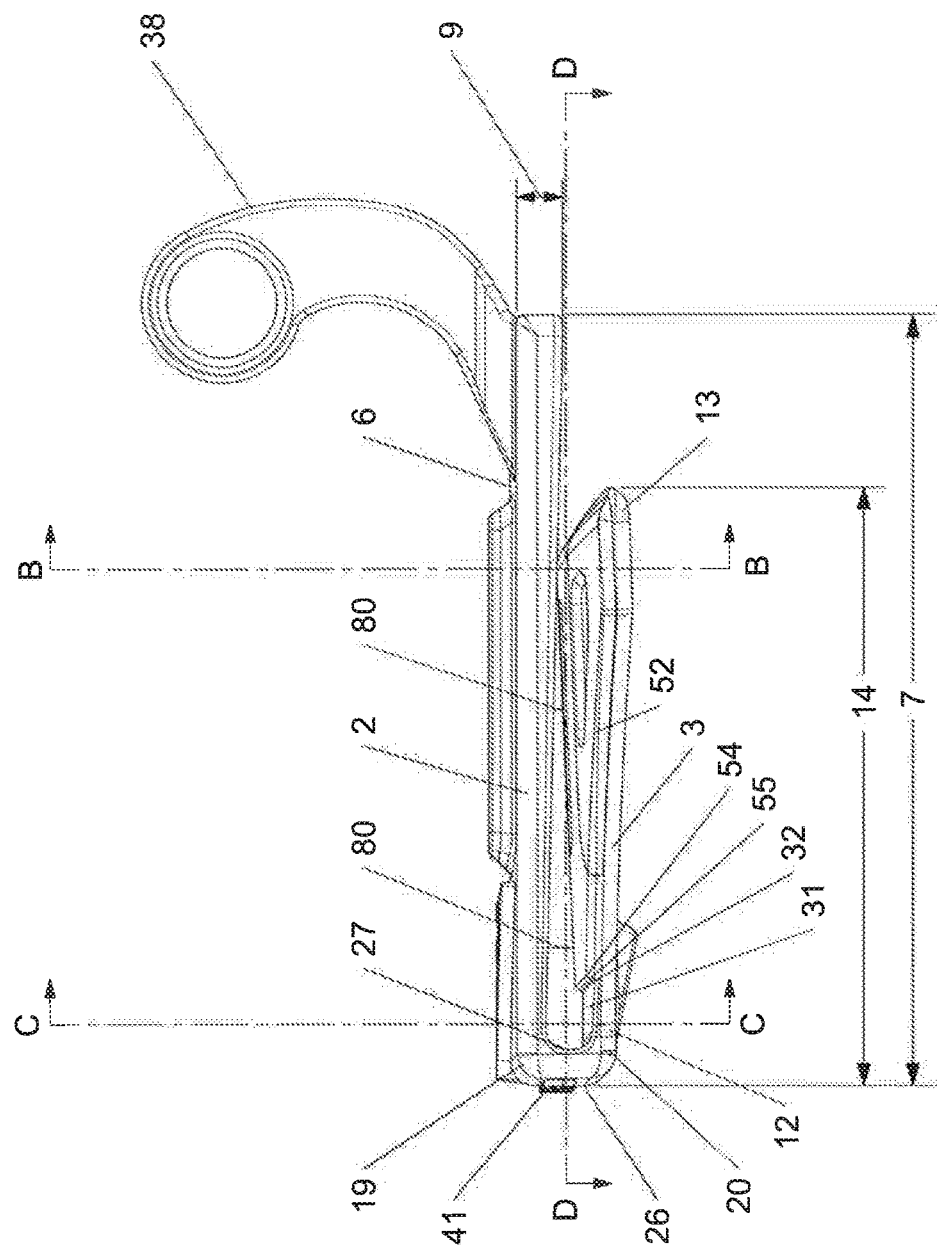
FIG. 2 is a right elevation view of a preferred embodiment of the accessory mounting clip of the present invention.
Figure 3:
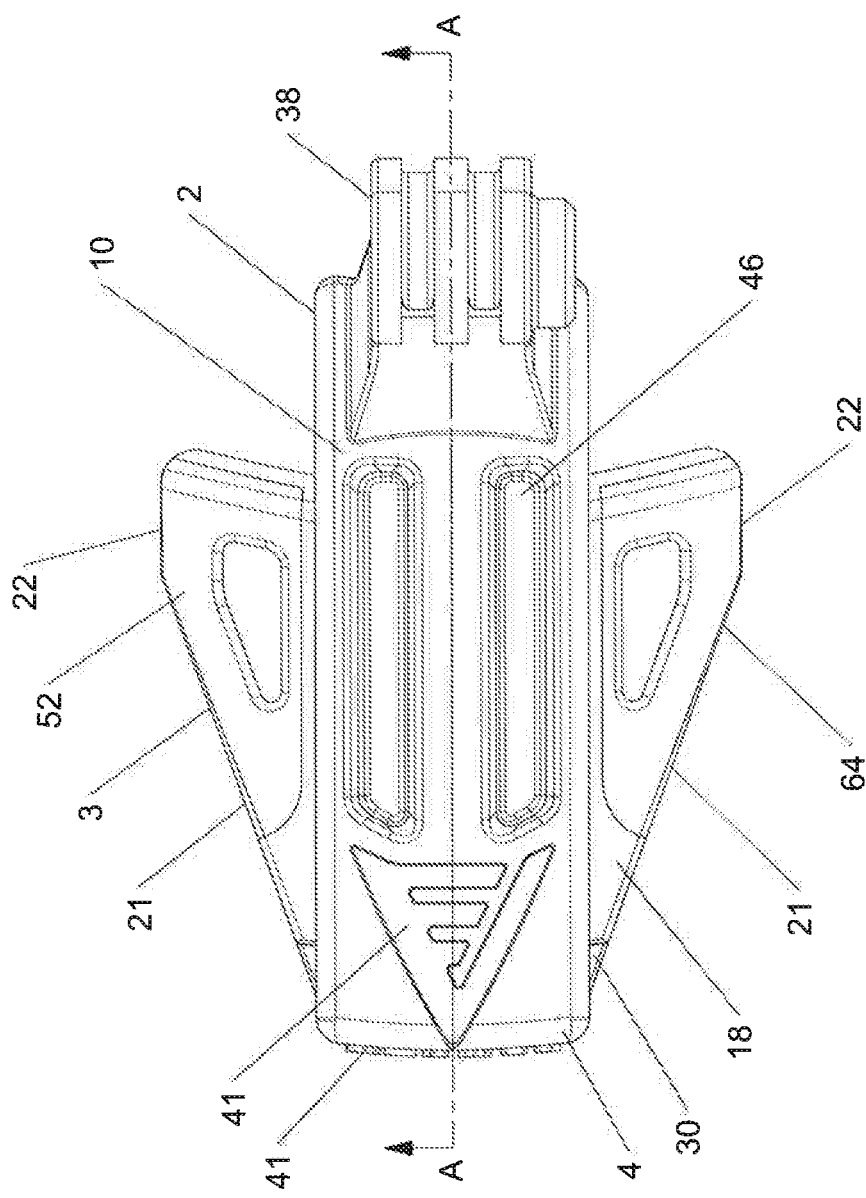
FIG. 3 is a top plan view a preferred embodiment of the accessory mounting clip of the present invention.
Figure 4:
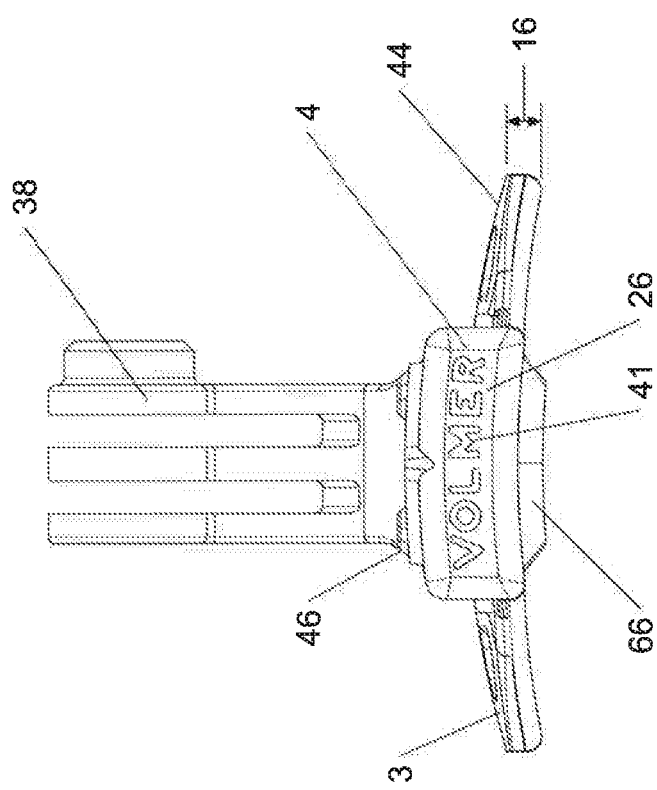
FIG. 4 is a front elevation view of a preferred embodiment of the accessory mounting clip of the present invention.
Figure 5:
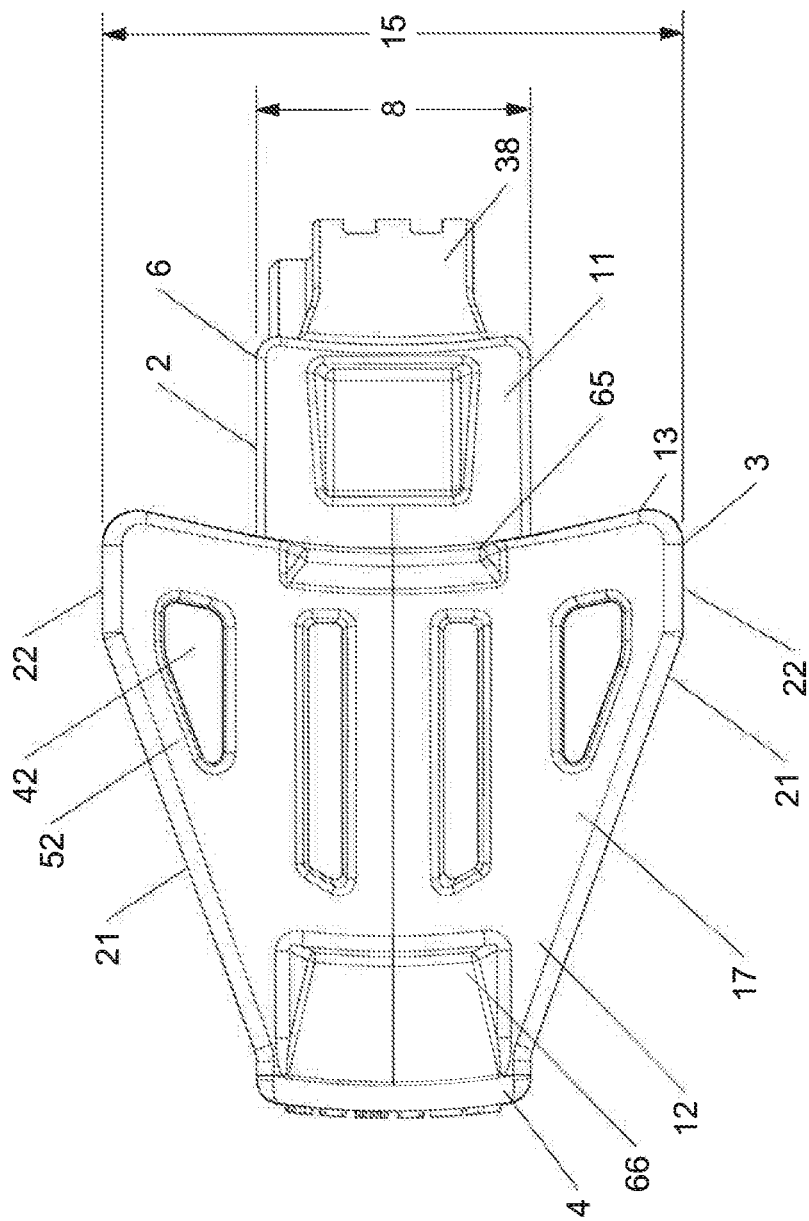
FIG. 5 is a bottom plan view of a preferred embodiment of the accessory mounting clip of the present invention.
Figure 6:
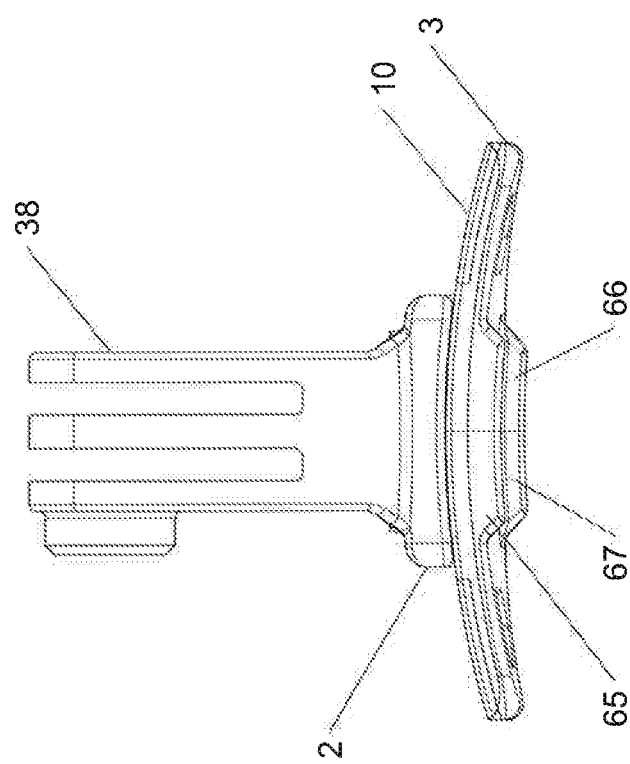
FIG. 6 is a rear elevation view of a preferred embodiment of the accessory mounting clip of the present invention.
Figure 7:
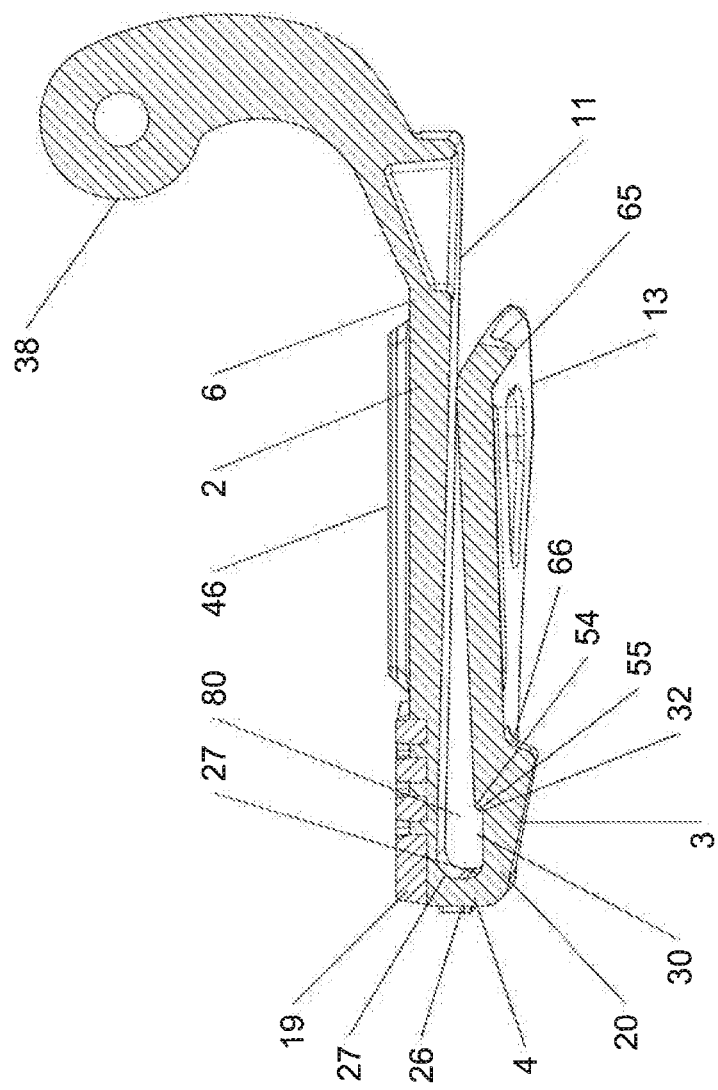
FIG. 7 is a side cross-sectional view of a preferred embodiment of the accessory mounting clip of the present invention taken along line A-A of FIG. 3.
Figure 8:
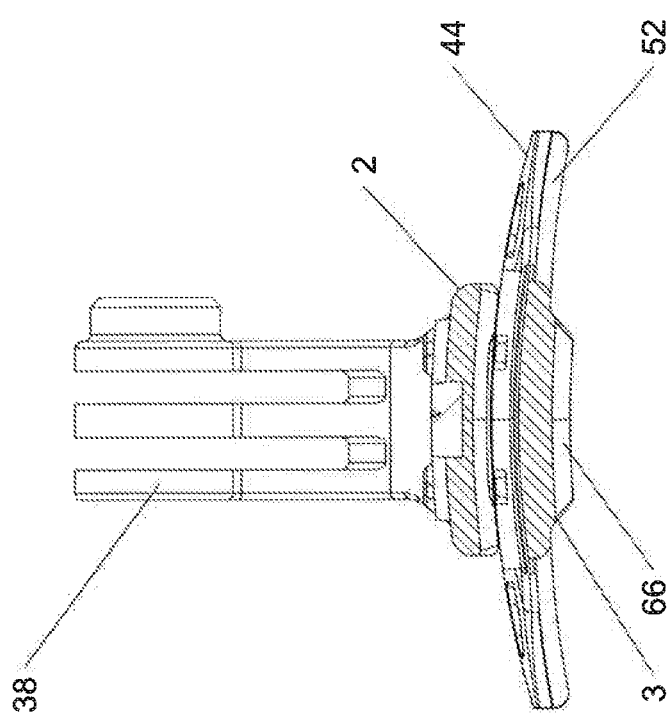
FIG. 8 is a front cross-sectional view of a preferred embodiment of the accessory mounting clip of the present invention taken along line C-C of FIG. 2.
Figure 9:
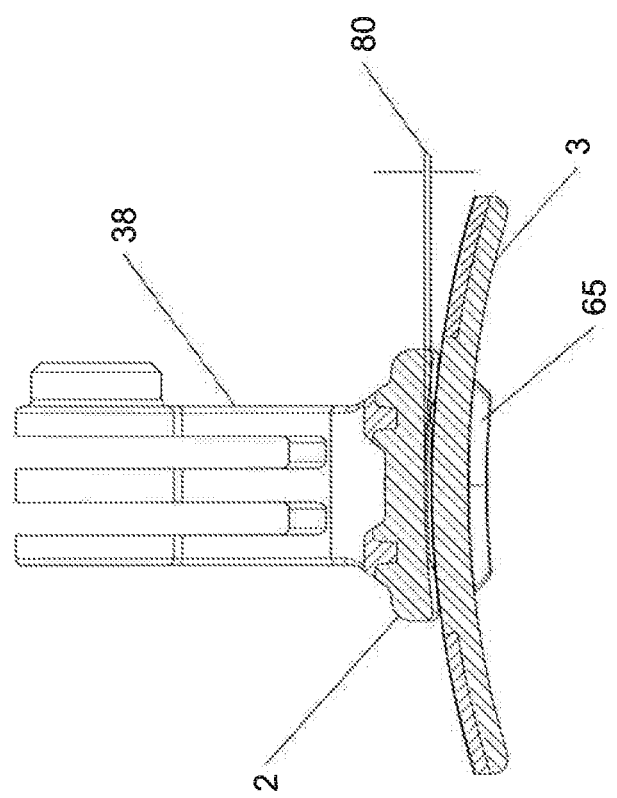
FIG. 9 is a front cross-sectional view of a preferred embodiment of the accessory mounting clip of the present invention taken along line B-B of FIG. 2.
Figure 10:
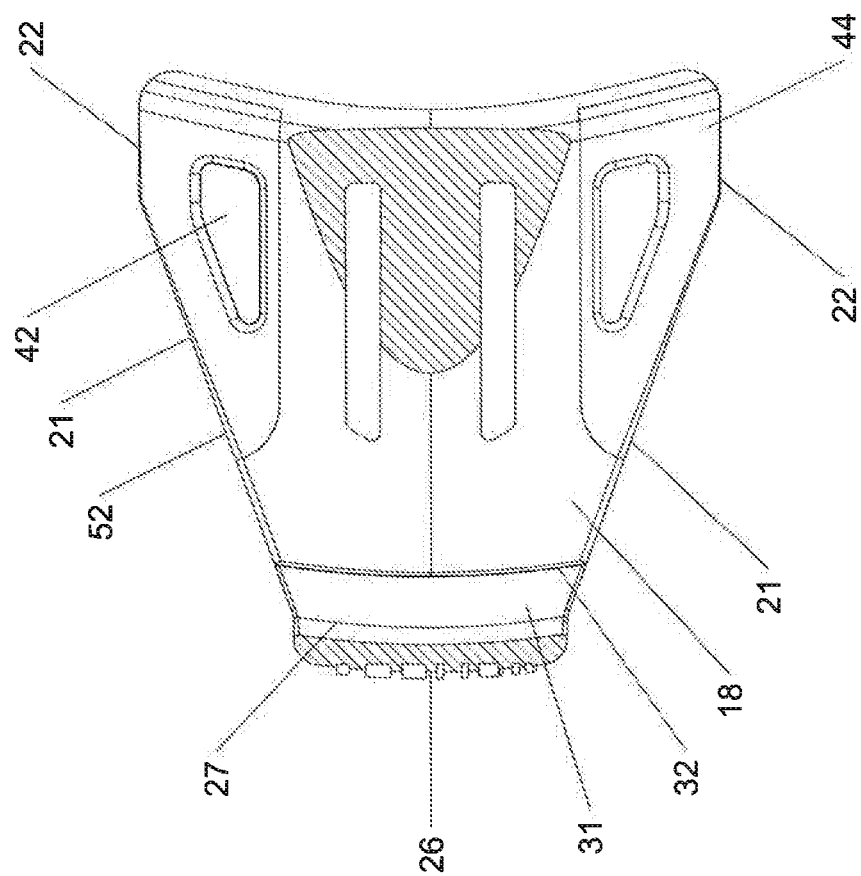
FIG. 10 is a top plan cross-sectional view of a preferred embodiment of the accessory mounting clip of the present invention taken along line D-D of FIG. 2.
Figure 11A:
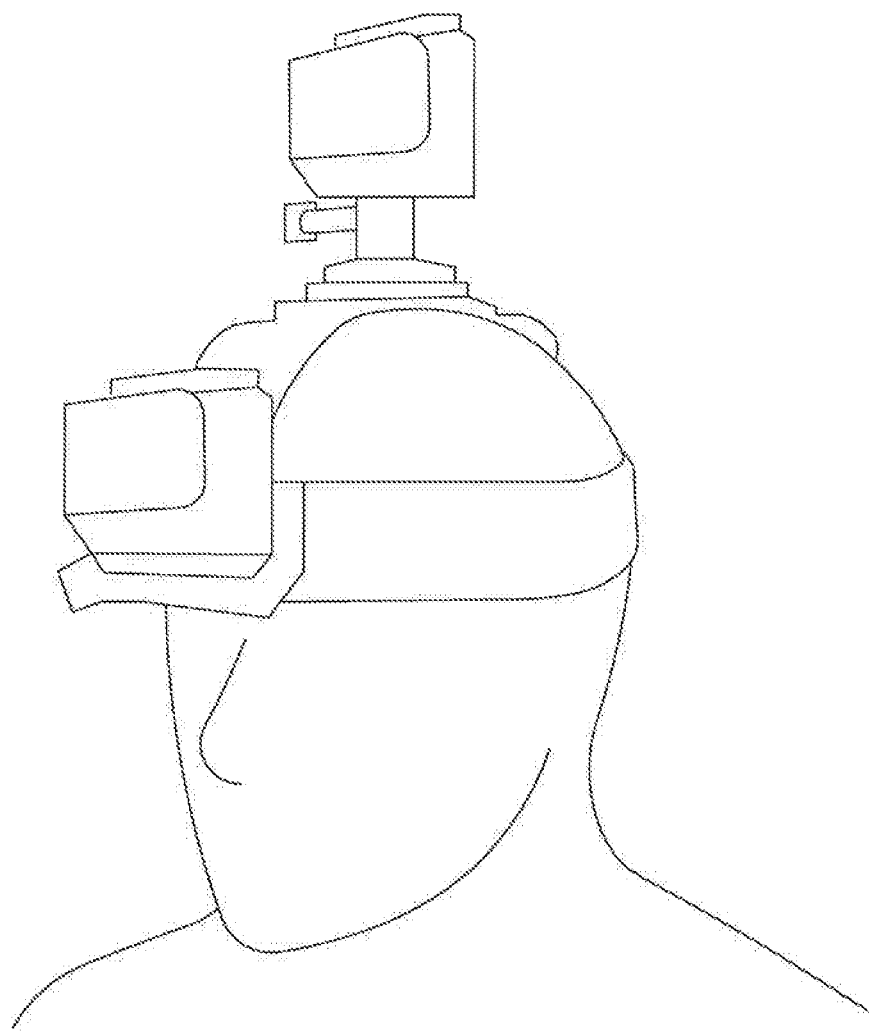
FIGS. 11A-11G depict exemplary prior art devices that are intended to attach to a user's head or the brim of a hat for purposes of mounting an accessory device.
Figure 11B:
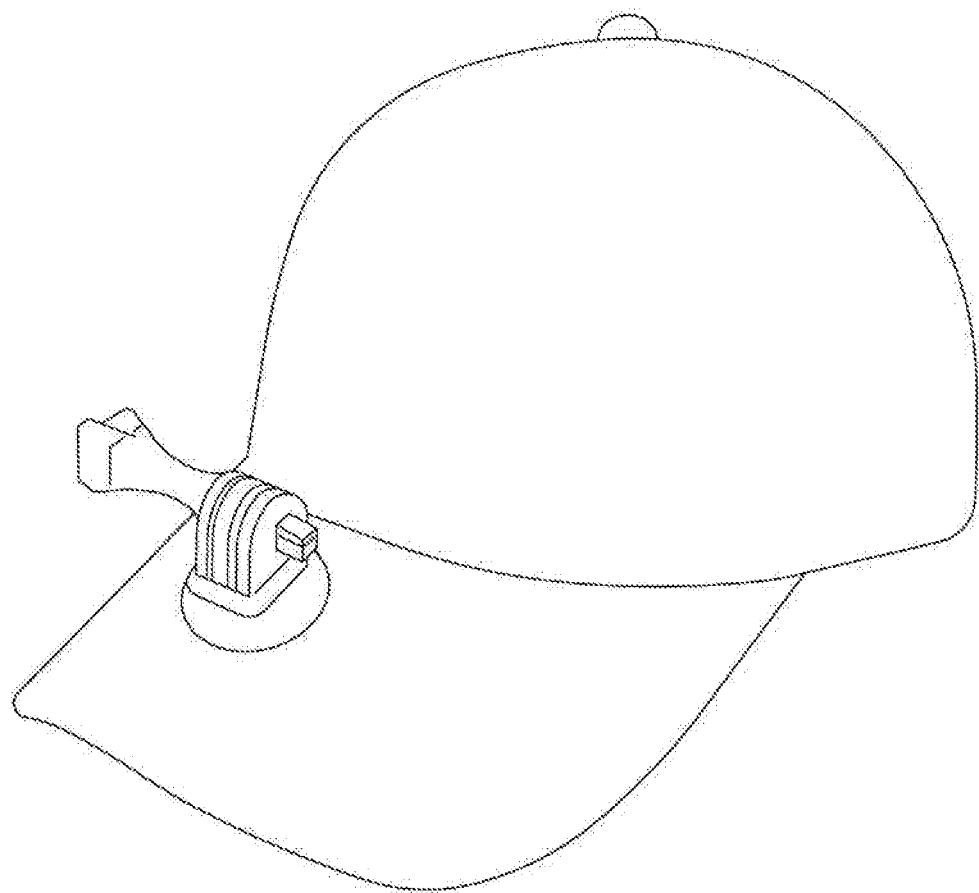
Figure 11C:
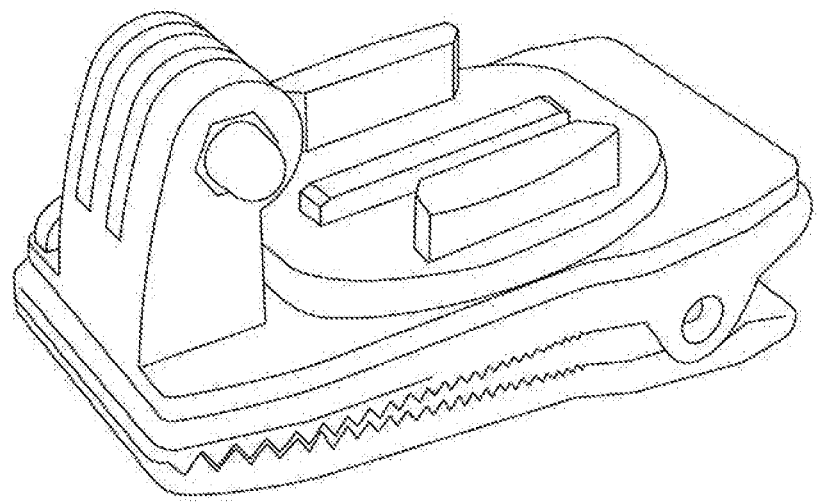
Figure 11D:
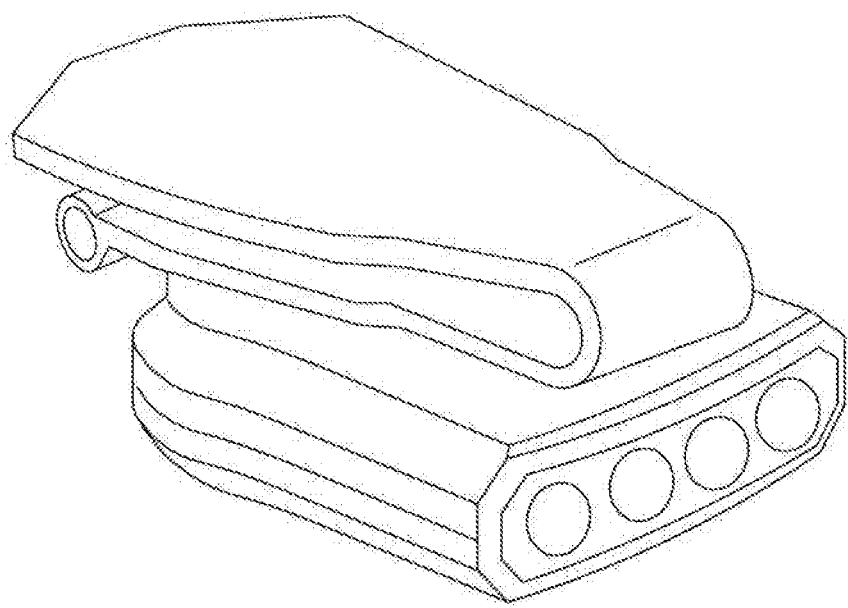
Figure 11E:
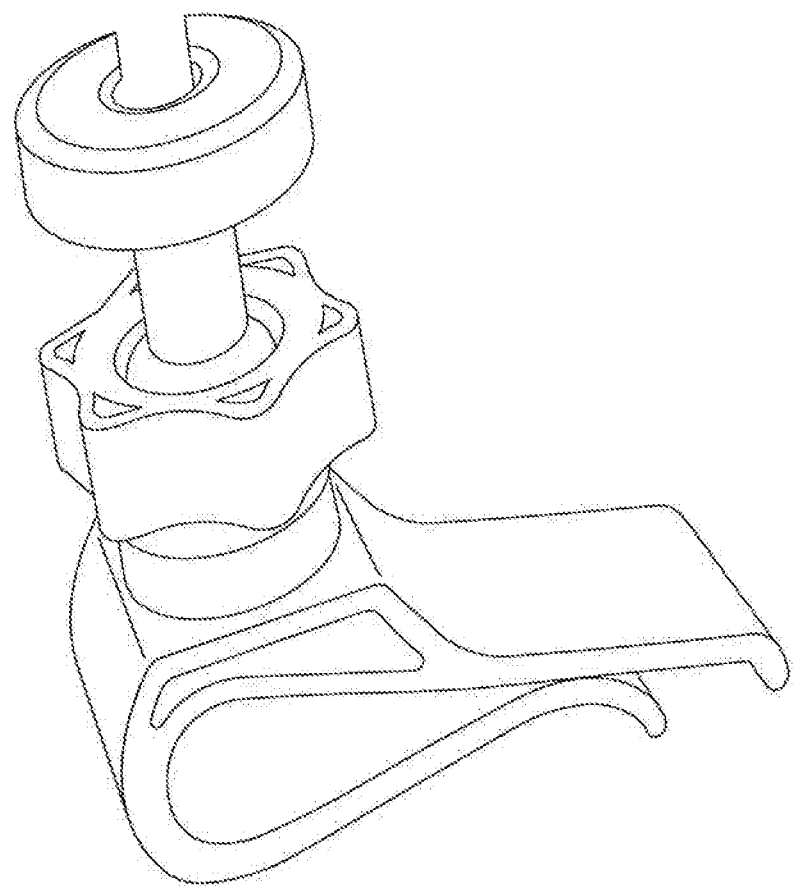
Figure 11F:
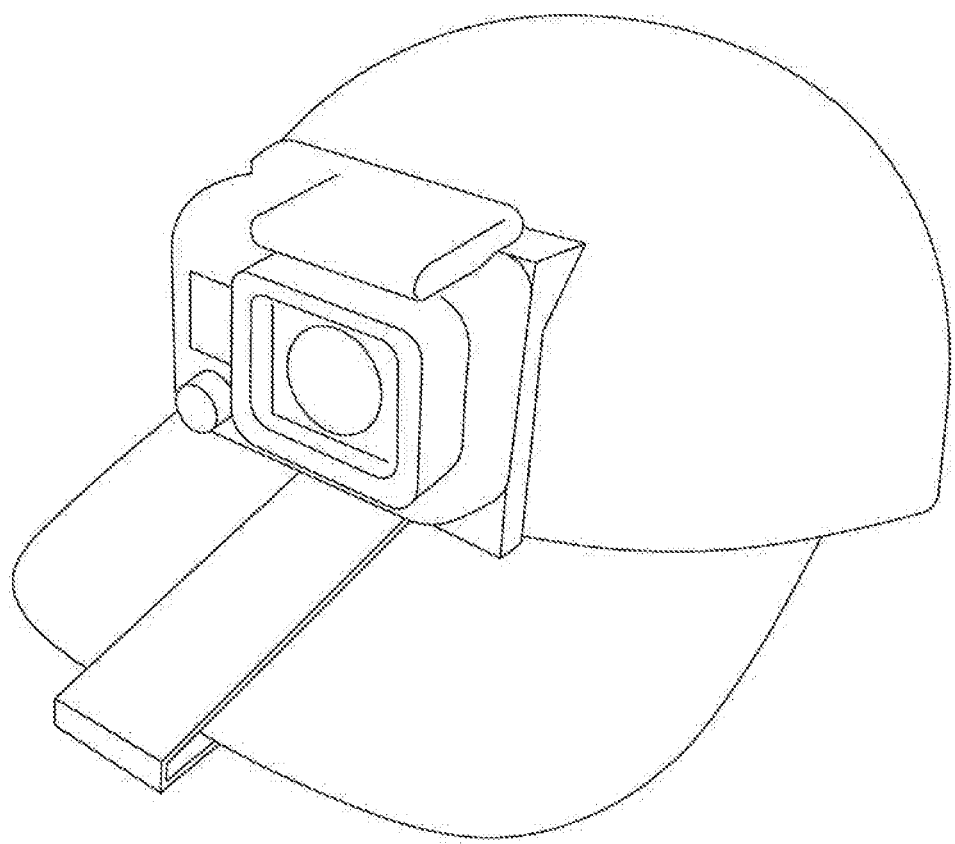
Figure 11G:
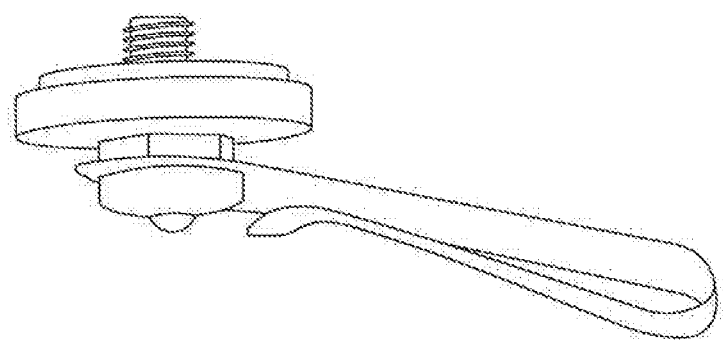

As noted, channel 30 may be further enhanced such that floor 31 of channel 30 follows the convex contour (best seen in FIG. 4) of top surface 18 of panel 3 and is thus itself upwardly convex. The convexity of floor 31 has a preferred radius closely equal to that of transverse curvature of brim 71. Also, as can be best seen in FIGS. 7, 10 and 14 brim-facing surface 27 of nose segment 4 is preferably concave in the front-to-back direction and that concavity can have an optimal radius closely equal to that of the radius of the edge curvature of brim edge 72. This concavity in inner, brim-facing surface 27 increases the surface area contact of clip 1 with brim edge 72. As with top surface 18 of panel 3, brim facing surface 27 may be texturized to increase its purchase on brim edge 72. Additionally, as is shown in FIG. 10, sidewall 32 is convex and the radius of the convexity is preferably closely equal to the radius of curvature of brim front edge 72. This convexity allows sidewall 32 to have a larger contact surface with bunched fabric border material 79.

Preferred embodiment clip 1 may include elongate ribs 46 on top surface 10 of panel 2. Ribs 46 add structural rigidity to first panel 2, which prevents it from twisting and flexing when the weight of an accessory item is applied to clip 1. In the depicted embodiment ribs 46 are longitudinally oriented on panel 2, but can be also be oriented transversely or diagonally on panel 2 to achieve a desired directional rigidity. Ribs 46 also serve as a rest stop or support for a camera or other device that can flip downward from mounting structure 38. Ribs 46 thereby protect the sensitive surfaces such as the lens surfaces of such cameras.

Figure 15A:
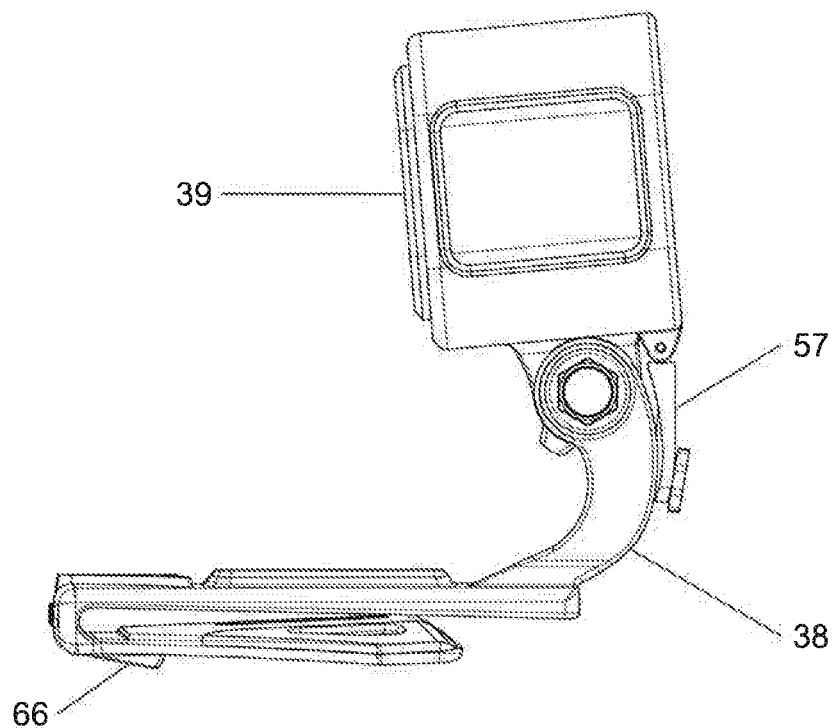
FIGS. 15A and B depict an embodiment of the present invention clip having a device positioning stop that allows the user to establish a preset positioning setting on the clip for a given accessory device for repeatable, quick and easy deployment of the accessory device.
Figure 15B:
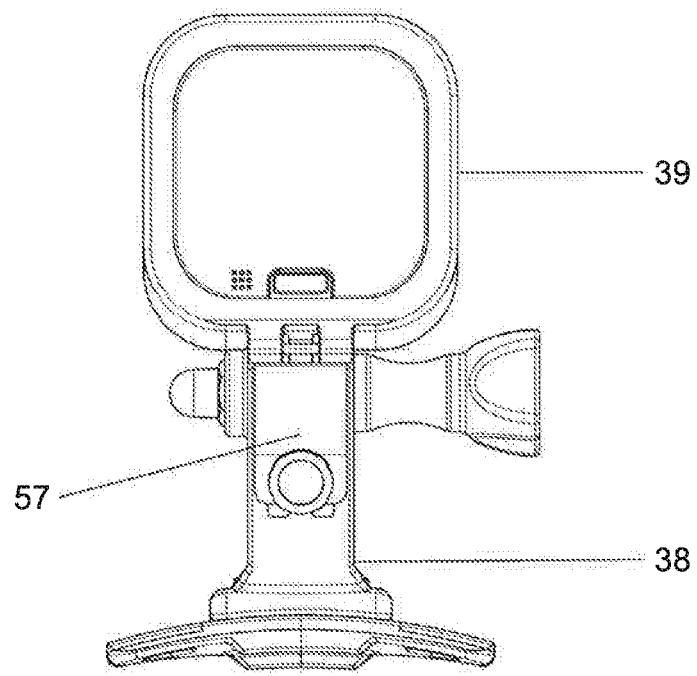

Users deploying POV cameras on their hats often find it difficult to know if their camera is properly positioned or angled to record the best scene. To remedy this problem clip 1 may include a position stop 57 on or operable with accessory mounting structure 38. Such an alternate embodiment clip is shown in FIGS. 15A and 15B, which show a stop 57 as part of a mounting structure 38 sized and shaped to secure a GoPro brand camera. In operation a user will position stop 57 on mounting structure 38 through trial and error to find the best positioning angle of whatever device (e.g., light or POV camera) 39 he or she is using. Once that optimum positioning angle is determined, the user can then set and fix (preset) stop 57 to the correct location on mounting structure 38. Afterwards, a user can simply mount the selected device 39 to clip 1 and angle the device against stop 57 and be assured that the device in properly angled (according to the usual and customary way the user wears his or her hat) to best capture or illuminate the area in front of the user. Hence, deploying the accessory device on the clip can be performed repeatedly quick and easily.

As shown in the figures, clip 1 may also include a thin (non-obscuring) tab 65. Tab 65 depends from second panel 3 and provides a vertical surface 67 (which may be angled as shown in the figures) upon which a user's thumb or finger can push against to remove clip 1 from brim 70. In a more preferred embodiment, clip 1 may include display tab 66 depending from panel 3. The embodiment clip shown in the figures includes both types of tabs 65 and 66, but the clip could include either tab individually. Tab 66 is designed not limitedly for removal of the clip, but to provide a mechanism by which the user can be alerted to one or more operational statuses of a mounted device. In this embodiment, vertical surface 67 of tab 66 may include one or more indicators (shown by way of example in the embodiment as lights) 68. One or more indicators 68 are part of an electronic receiving circuit (not shown) that is in wireless communication with device 39 (such as via wifi or Bluetooth signaling). The communication between the device and the receiving circuit of display tab 66 allows the one or more indicators to indicate to the user various statuses of the device. Such statuses could include the situation where the device: is recording, not recording or is running low on charge or battery power.

A clip constructed in accordance with the present invention is able to securely retain and position common accessory devices, including the heavier camera and light devices. The clip can be manufactured in a variety of sizes to accommodate different size hat brims. The clip may be made of a plastic, carbon fiber or metal base material. If plastic, the clip is preferably injection molded or 3D-printed from plastic.

The design of the inventive clip described above also has beneficial application as the foundation for a two-piece clip or a clip system that allows for interchangeable attachment of a variety of device mounting structures. In this respect, many accessory device manufacturers utilize distinct mounting supports for their devices. In many cases, these mounting supports are not compatible with other devices. Thus, it would be beneficial to have a clip device that allows for interchanging of mounting supports to allow mounting of these devices from different manufacturers. This can be done via an inventive system in which a clip body includes at its proximal end structure to releasably engage end-pieces allowing for a variety of mounting supports. In the preferred embodiment the clip body substantially meets the design of the above described clip. The components of such an embodiment system are shown in FIGS. 18-26C.

In one embodiment, a system for interchangeable mounting of accessory devices on a hat brim comprises a clip body 401 and one or more end-pieces 490. Clip body 401 comprises a top (first) panel 402 and a bottom (second) panel 403. Top and bottom panels 402, 403 respectively have a length 407, 414, width 408, 415, inner surface 411, 417, outer surface 410, 418 proximal end 406, 413 and distal end 405, 412. Top panel and bottom panel 402, 403 are each resiliently connected at their distal ends to nose segment 404. Nose segment 404 has an outer (front-facing) surface 426 and an inner (brim-facing) surface 427. Bottom panel 403 has a wedge shaped portion 452 in which the width 408 of the panel 403 increases from distal end 412 of panel 403 to proximal end 413 of the panel 403. Clip 401 may have all of the features described above for clip 1 sans the integral mounting structure 38, which is instead replaced by an attachment mechanism 491 sized and shaped for complementary attachment to an end-piece 490. By having a system including multiple end-pieces 490, each with a mounting post 438 for a different accessory mounting mechanism, the interchangeability of end-pieces 490 allows the clip system to be used for a multitude of accessory devices.

Figure 36:
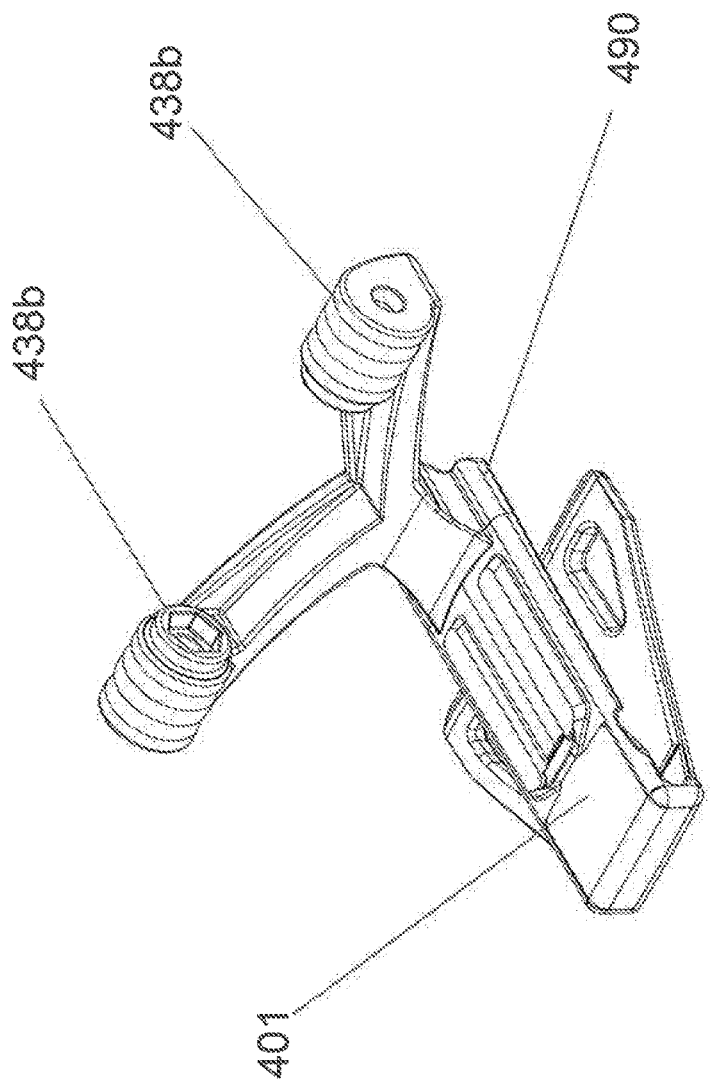
FIG. 36 is a perspective view of an embodiment system showing an end-piece attached to a clip body, the end piece having dual mounting structures.

In the preferred embodiment system, clip body 401 will share many of the structural features as are or may be included on clip 1. In this respect, on clip body 401 the inner (bottom) surface of first panel 402 is concave and the inner (top) surface 418 of second panel 403 is convex. Proximal end 406 of first panel 402 includes a first attachment structure 491. The one or more end-pieces 490 include device mounting structure 438 and a second attachment structure 492 sized and shaped for releasable complementary attachment to first attachment structure 491. Preferable structure for complementary attachment structures 491, 492 include a tongue and slot arrangement, whereby a tongue 493 on clip body 401 frictionally inserts and is engaged by slot 494 on end-piece 490. Such exemplary complementary structure is shown in FIGS. 18-26C. Other types of mechanical engagement methods may be used such as a side release buckle or a slide entry flared bead/undercut track structural arrangement. Mounting structure 438 on end-piece 490 can include a positioning stop allowing a user to preset a position of the accessory device on the clip. By utilizing a system comprising a clip body with interchangeable end pieces, a wider variety of end pieces and mounting structures can be utilized with the system. For example, FIG. 36 shows an embodiment system showing end-piece 490 attached to clip body 401. As seen in this figure, end piece 490 has dual mounting structures 438*a* and 438*b* that allow the clip system to receive multiple lights, multiple cameras or a camera and a light.

Note that the invention is also drawn to the clip body of the immediately described system that allows for interchangeable mounting of accessory devices on a hat brim. The clip body has the physical structures described above, particularly proximal end 406 of top panel 402 including a first attachment structure 491 sized and shaped to releasably attach to a complementary second attachment structure 492 connected to an end-piece 490.

In another embodiment, the design of the present invention clip and also the systems using a similarly structured clip body of FIGS. 18-26C can be adapted to include a mount for holding a microphone/jack. Such are enhanced clip is shown in FIGS. 27-32. As shown in those figures, a clip 501 (or the clip body 401) for mounting accessory devices on a hat brim comprises the same structural elements as the inventive clip 1 described above. Clip 501 thus comprises two panels 502, 503 can also have one or more of the additive features described above for clip 1. Clip 501 further includes mount 595. Mount 595 is sized and shaped to releasably hold a readily purchasable microphone/jack 596 in wired or wireless electrical communication with an accessory device 539 mounted on the clip.

Microphone/jack mount 595 preferably descends from outer surface 517 of lower (second) panel 503. Mount 595 may be integrally formed in lower panel 503 or panel 503 may be formed to mechanically receive microphone/jack mount 595 such as by providing outer surface 517 with a friction fit receiving hole to receive a post formed in mount 595. Mount 595 could also be attached to lower panel 503 via an adhesive. The wedge-shaped portion 552 of panel 503 (particularly cutout 542) provides an ideal location at which to provide receiving means by which to frictionally engage a microphone/jack mount 595. For example, cutout 542 could itself be the receiving means in which to insert a press-fit, silicone projection attached to microphone/jack 596. Additionally, in some recording situations it is preferable that the microphone/jack 596 point towards the user's face so that the microphone fully captures the user's narration. As shown in the figures, in the depicted embodiment, microphone/jack mount 595 is preferably sized and shaped so as to releasably hold the microphone/jack 596 in a position whereby the microphone/jack 596 points in a direction down and away from the nose segment 504 of the clip 501 (i.e., towards the face of a user wearing the hat on which clip 501 is mounted).

In a more preferred embodiment, clip 501 includes wireholding means 598 to releasably engage a wire 599 leading from an accessory device 539 mounted on clip 501 to a microphone/jack 596 held by the mount. A preferred wireholding means 598 is a channel 598*a* integrally formed in the clip. Alternative wire-holding means 598 includes one or more spring clips integrally formed in clip 501.

Figure 30:
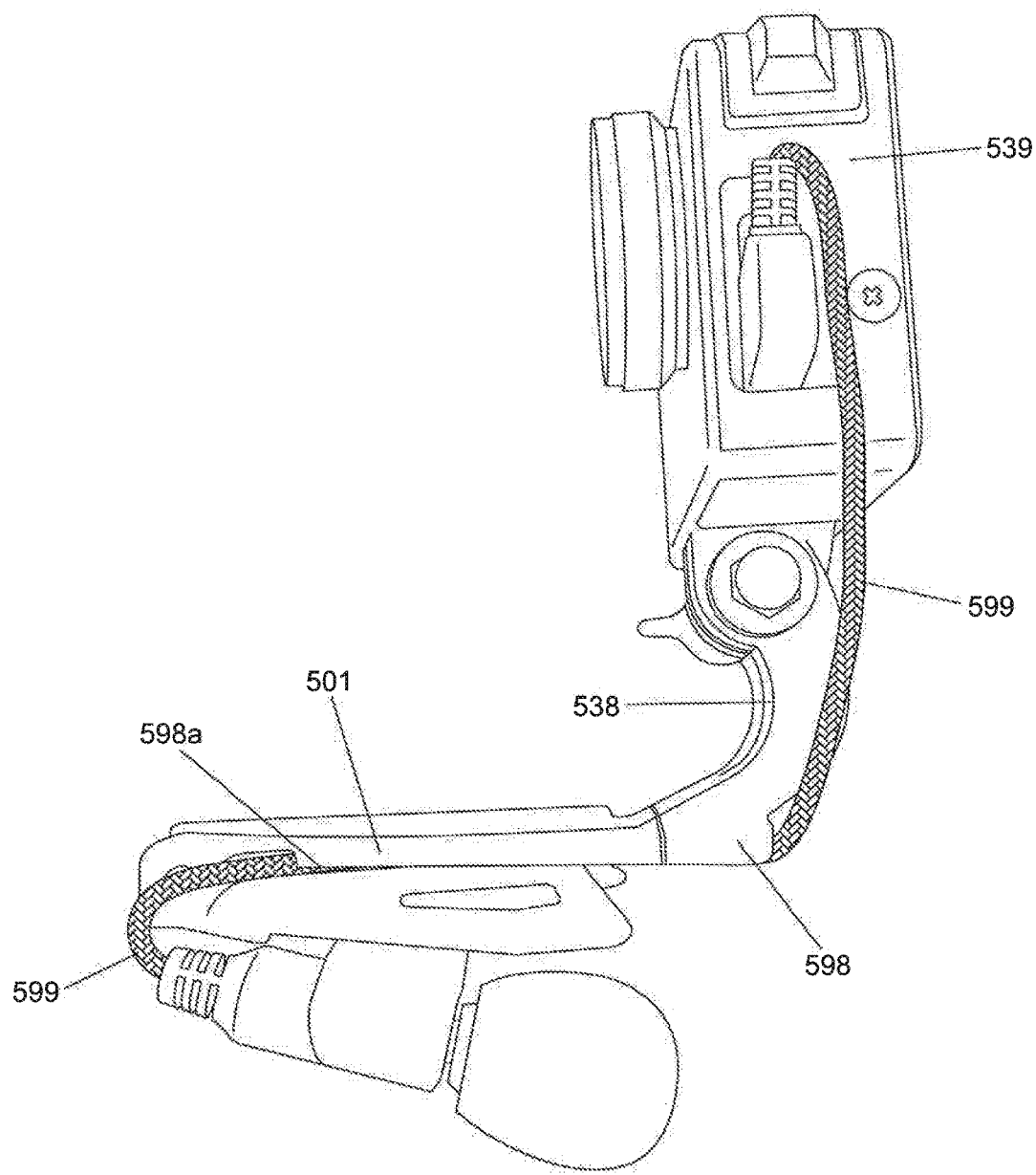
FIG. 30 is a right side elevation view of an alternative embodiment clip including a mount sized and shaped to releasably hold a microphone/jack. The clip in the image is shown with a mounted camera in electrical communication with a mounted microphone. The shown clip includes integral wire-holding means to securely hold a wire leading from a held microphone or microphone jack to a mounted accessory device.
Figure 31:
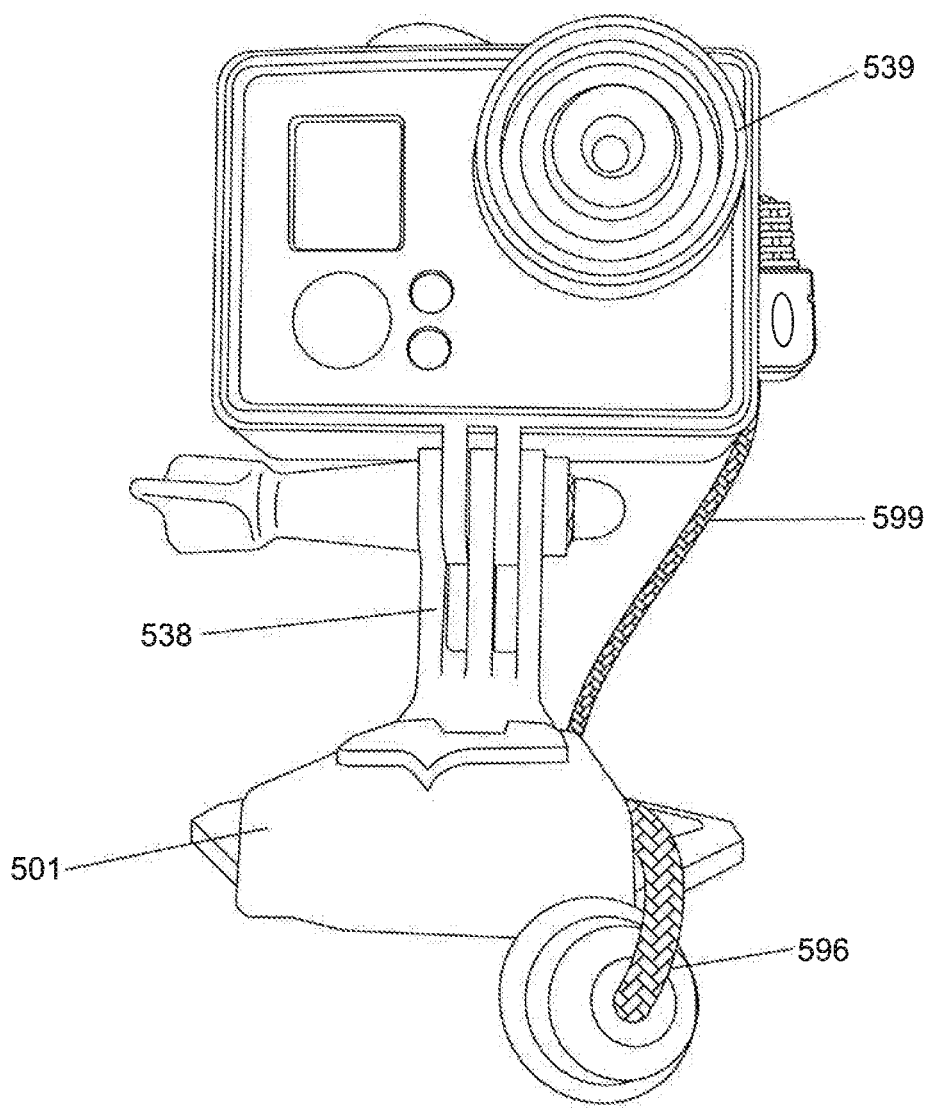
FIG. 31 is a front elevation view of an alternative embodiment clip including a mount sized and shaped to releasably hold a microphone/jack. The clip in the image is shown with a mounted camera in electrical communication with a mounted microphone. The shown clip includes integral wire-holding means to securely hold a wire leading from a held microphone or microphone jack to a mounted accessory device.
Figure 32:
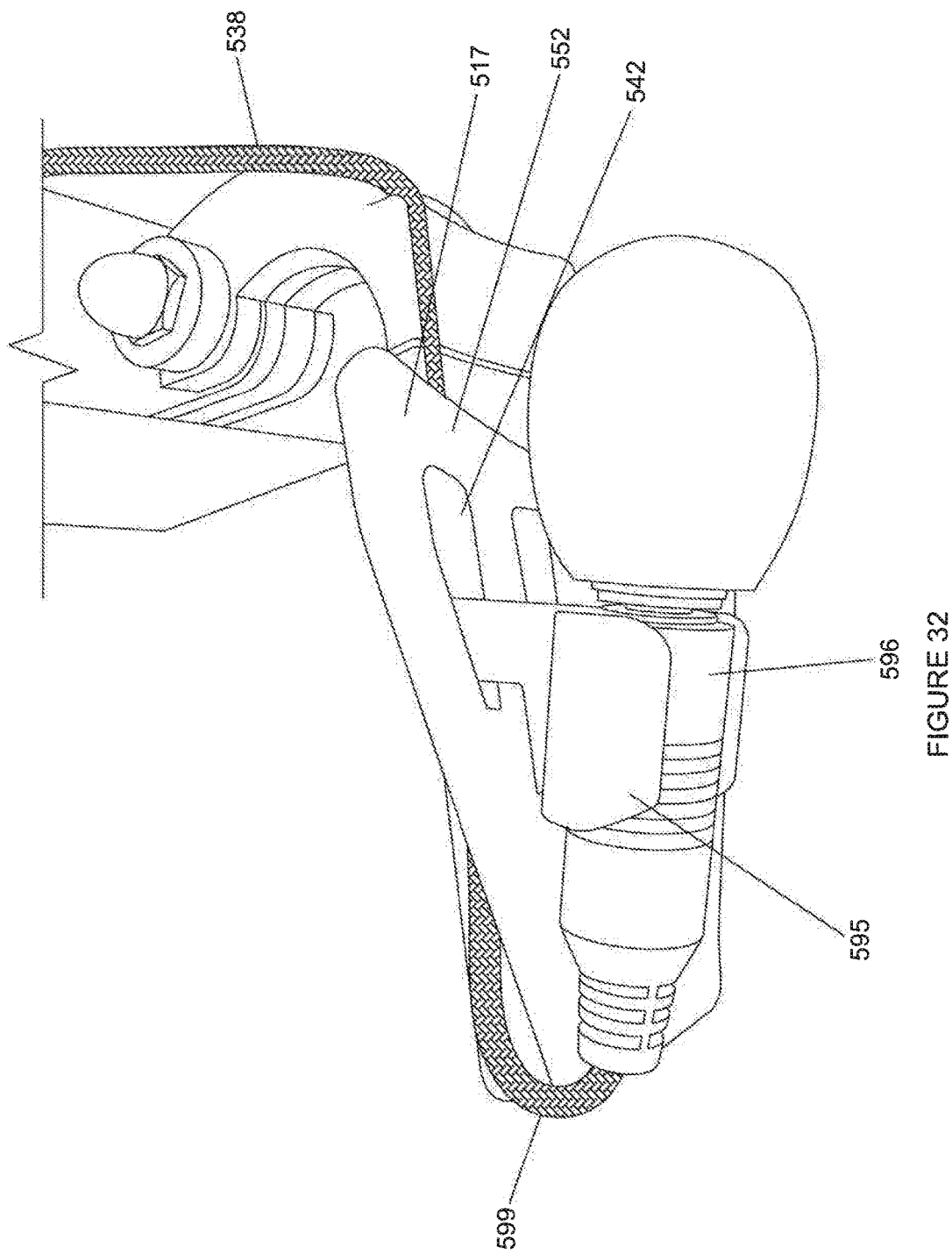
FIG. 32 is a bottom perspective view of an alternative embodiment clip including a mount sized and shaped to releasably hold a microphone/jack. The clip in the image is shown with a mounted camera in electrical communication with a mounted microphone. The shown clip includes integral wire-holding means to securely hold a wire leading from a held microphone or microphone jack to a mounted accessory device.

The microphone/jack mount design works particularly well with arrangements that include a microphone cable 599 that can interface with the mini USB connection on a camera. An appropriate length cable 599 is one that extends from a device 539 mounted at the proximal end of clip 501, along the length of clip 501 and on to the lower surface 517 of bottom panel 503. Cable 503 may be directly connected to a microphone/jack 596. As seen in the figures, after cable 599 descends from the accessory device (camera) 539, cable 599 threads through clip 501 through integrated wire holding mechanism 598. This is best seen in FIG. 30 in which integrated wire holding mechanism 598 is embodied as channel 598*a*. This design leads to a fully and direct integration of a microphone with the hat clip for a lower profile and weight reducing option. The integrated wire holding means 598 means that any wire between device 539 and microphone/jack 596 follows the contour of clip 501 in close proximity to clip 501 and thus is particularly beneficial in reducing dangling cable or cable slack that can be snagged by external structure such as leaves, branches or other projecting elements.

Figure 29:
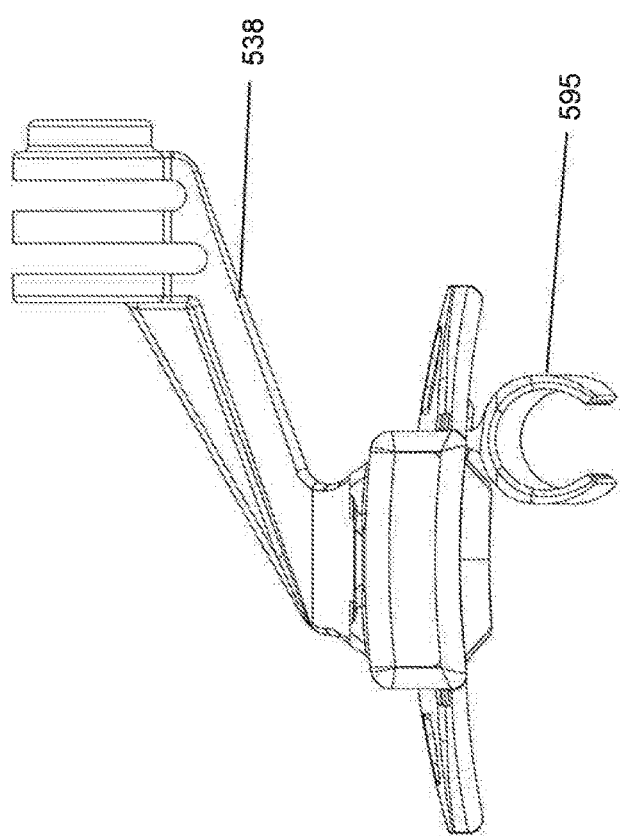
FIG. 29 is a front elevation view of an alternative embodiment clip including a mount sized and shaped to releasably hold a microphone/jack in electrical communication with an accessory device mounted to the clip and that has an offset accessory device mounting structure.

As shown in the figures, microphone/jack mount 595 is preferably in the form of a two-prong spring clip allowing the microphone/jack 596 to be press fit into the clip and retained. FIG. 29 is a front elevation view of an alternative embodiment clip 501 including a mount 595 adapted to releasably hold a microphone/jack in electrical communication with an accessory device mounted to the clip. Clip 501 of FIG. 29 has an offset device mounting structure 538.

Figure 33:
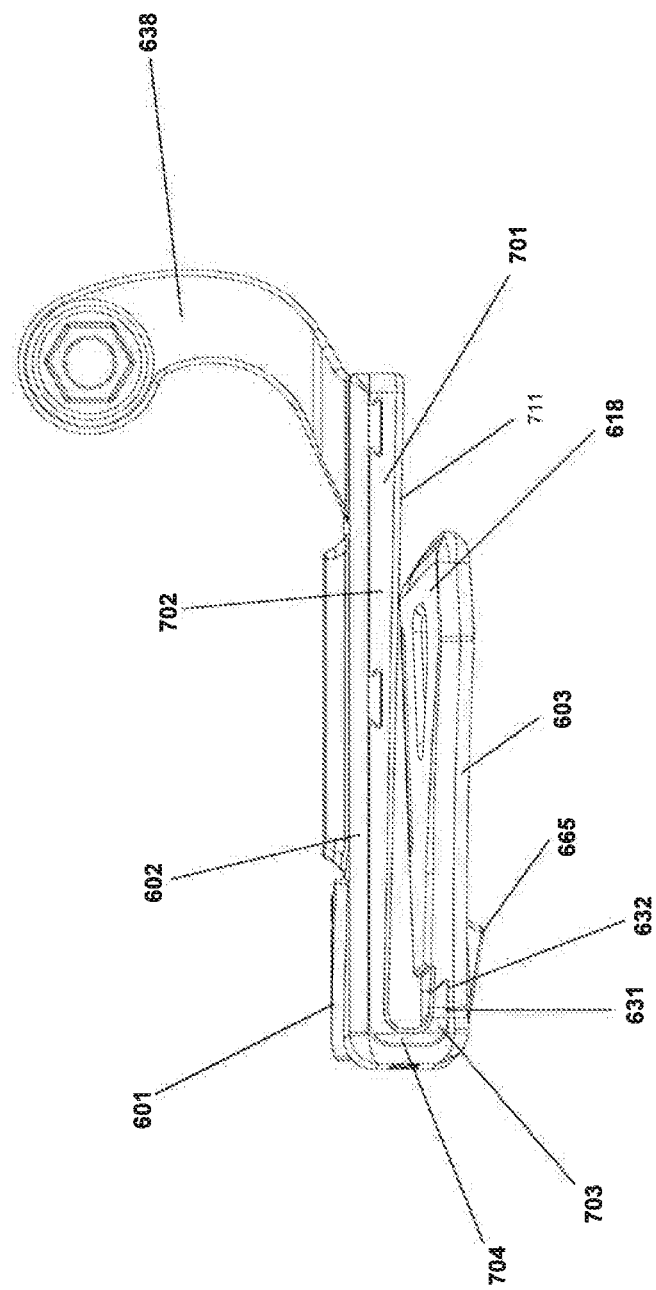
FIG. 33 is a right side view of an embodiment of a present invention system utilizing a clip body and one or more panel inserts to accommodate brims of varying thicknesses.
Figure 34A:
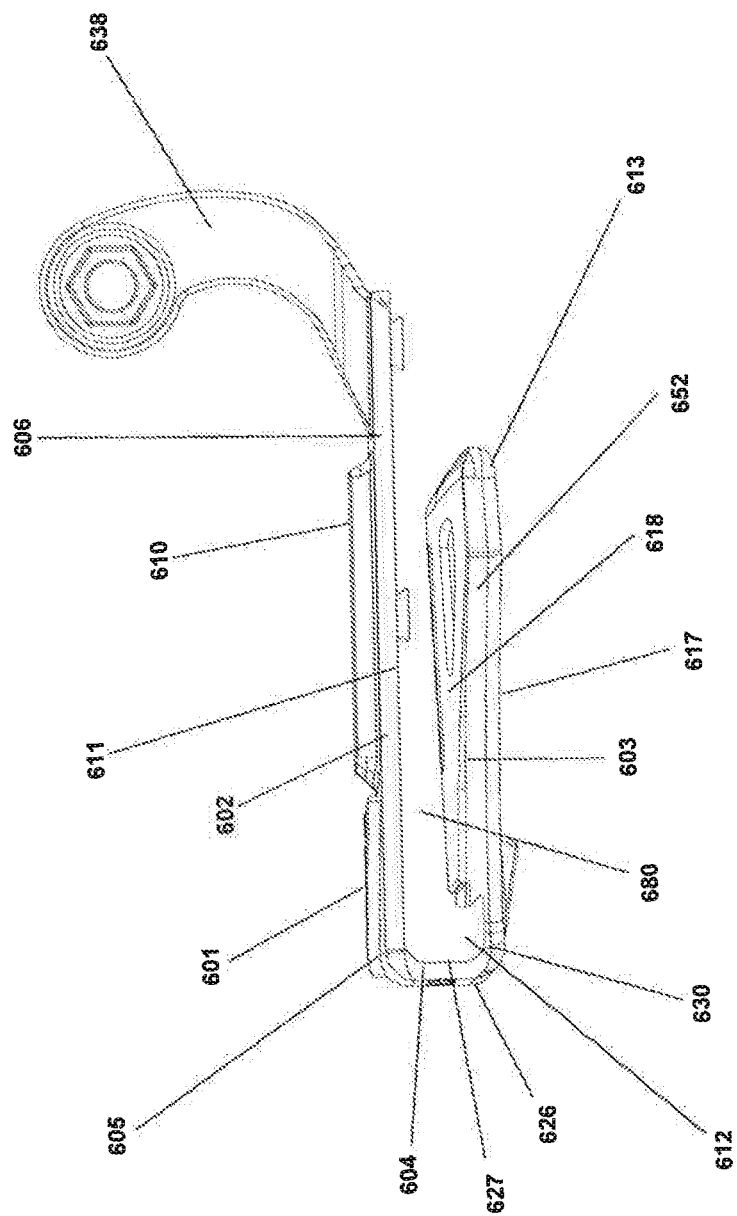
FIG. 34A is a right side view of an embodiment of a clip body (with the panel insert removed) of the embodiment present invention system of FIG. 33 that accommodates brims of varying thicknesses.
Figure 34B:
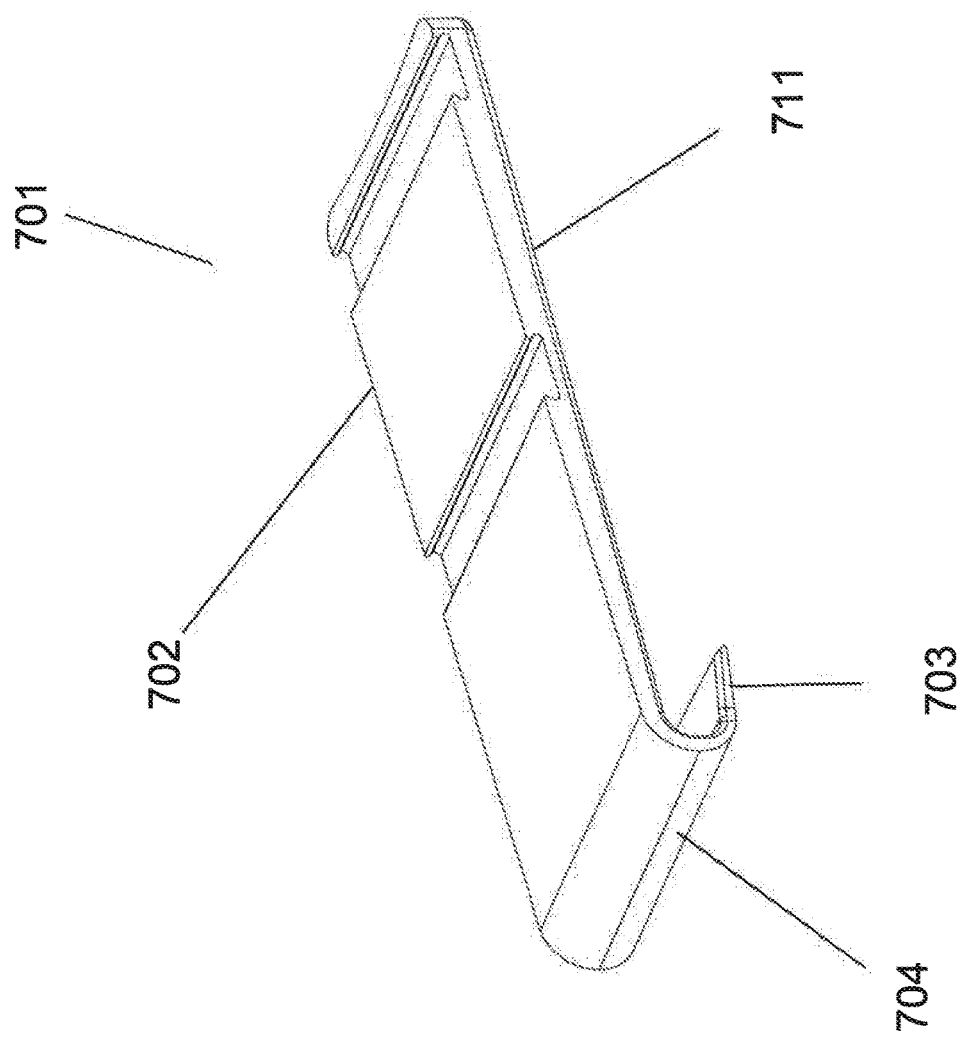
FIG. 34B is a perspective view of an embodiment insert.

The design of the inventive clip 1 described above also has beneficial application as part of a clip system that allows for attachment of accessory devices to brims of varying thicknesses. An embodiment of such a system is shown in FIGS. 33, 34A and 34B. In this respect, though the clip described above has shown to have good application on the common brim thicknesses found on commercially available baseball caps, the variance in brim thicknesses can affect the purchase of clip 1 on the brim. Thus, it would be beneficial to have a way to adjust the height of the spacing 80 defined by the top and bottom panels of the clip. This can be done via an inventive system in which a clip body 601 meeting the design of the above described clip 1 releasably engages an insert 701 that can be used to vary the vertical spacing 680 between top and bottom panels 602, 603 of clip body 601. Insert 701 can be sized and shaped so as to engage and cover either or both of panels 602, 603. The system can include one or more interchangeable inserts 701 of varying thicknesses, textures and size.

An embodiment system for mounting accessory devices on a hat brim is depicted in FIGS. 33-34B. Such an embodiment system comprises clip body 601 and one or more inserts 701. Clip body 601 comprises a top body panel 602 and a bottom body panel 603. Top body panel 602 and bottom body panel 603 respectively have a length and a width akin to that of clip 1. As shown in FIGS. 33 and 34A, top body panel 602 and bottom body panel 603 respectively have an inner surface 611, 618, an outer surface, 610, 617, a proximal end 606, 613 and a distal end 605, 612. Top body panel 602 and bottom body panel 603 are each connected at their distal ends 605, 612 to a body nose segment 604.

Body nose segment 604 has an inner surface 627 and an outer surface 626. Bottom body panel 603 has a wedge shaped portion 652 in which the width of bottom body panel 603 increases from distal end 612 of panel 603 to proximal end 613 of the panel. As with clip 1, the width of body bottom panel 603 at its proximal end 613 is preferably 1.5 to 2.5 times the width of top body panel 602 at its proximal end 606. Inner surface 611 of top body panel 602 is preferably concave. Inner surface 618 of bottom body panel 603 is convex. Outer surface 610 of top body panel 602 at proximal end 606 of top body panel 602 includes mounting structure 638 sized and shaped for receiving an accessory device such as a camera or light.

As best seen in FIG. 34B insert 701 includes an insert first panel 702. Insert 701 is sized and shaped so as to be received by clip body 601 whereby insert 701 is engaged by and contacts one of the panels of clip body 601 to reduce the intra-panel spacing 680 of clip body 601. In the depicted embodiment, insert first panel 702 of insert 701 is releasably engaged by clip body 601 and insert first panel 702 contacts inner surface 611 of top body panel 602. Preferably, insert 701 will contact all or a majority of an inner surface of clip body 601 (inner surface 611 of top body panel 602 in the depicted embodiment). Generally, the more surface of clip body 601 that insert 701 covers, the better the fabric gripping ability. In one embodiment, insert 701 is made from the same material as clip body 601. In another embodiment, insert 701 is made from a softer more resilient plastic or rubber material than is clip body 601. Inner surface 711 of insert 701 may be texturized to improve brim-gripping ability.

As noted above, insert 701 can be sized and shaped so as to engage and cover either or both of panels 602, 603. In an enhanced system embodiment shown in the figures, insert 701 further includes insert nose segment 704 connected to insert first panel 702. Nose segment 704 is sized and shaped such that when insert 701 is received by clip body 601, insert nose segment 704 contacts inner surface 627 of nose segment 604 of clip body 601. Bottom body panel 603 may include a channel 630 proximate to the connection point between the body nose segment 604 and the bottom body panel 603. In the embodiment depicted in FIGS. 33-34B, insert 701 is sized and shaped to cover and engage top panel 602 and contact inner surface 627 of nose segment 604, while having a short segment 703 that is received by channel 630 on lower panel 603. This is not meant to be limiting as the invention is broadly directed to a system comprising a clip and insert that reduces the spacing between the two panels of the clip. As in the case of clip 1, channel 630 of clip body 601 can include a floor 631. The floor of channel 630 is preferably convex. Channel 630 also preferably includes a sidewall 632 which is convex.

In an alternative embodiment, insert 701 could comprise a top insert panel and bottom insert panel. The two panels could be integrally connected through a nose section or could be separate pieces. In such an arrangement, the system would comprise a clip body as described above and a top insert panel (which would look like panel 702) and a bottom insert panel sized and shaped so as to be releasably engaged by lower panel 603 of clip body 601. The bottom insert panel contacts inner surface 618 of bottom body panel 603. Preferably, insert 701 will contact all or a majority of inner surface 611 of top body panel 602. This system may include an insert nose segment (such as nose segment 704) connecting top insert panel 702 to the bottom insert panel. Insert nose segment 704 is sized and shaped such that when top insert panel 702 and the bottom insert panel are releasably engaged by clip body 601, insert nose segment 704 contacts inner surface 627 of body nose segment 604. Top insert panel 702 and the bottom insert panel have respective inner surfaces, which may be texturized. The distal end of the bottom insert panel can include a channel as described above for clip 1.

The systems described above may include the above-described positioning stop (not shown in FIGS. 33-34B) that allows a user to preset a position of the accessory device on the clip. The systems may also include a tab 665, microphone/jack mount 595 or both depending from bottom body panel 603. Tab 665 may be structured as described above for clip 1.

Figure 35:
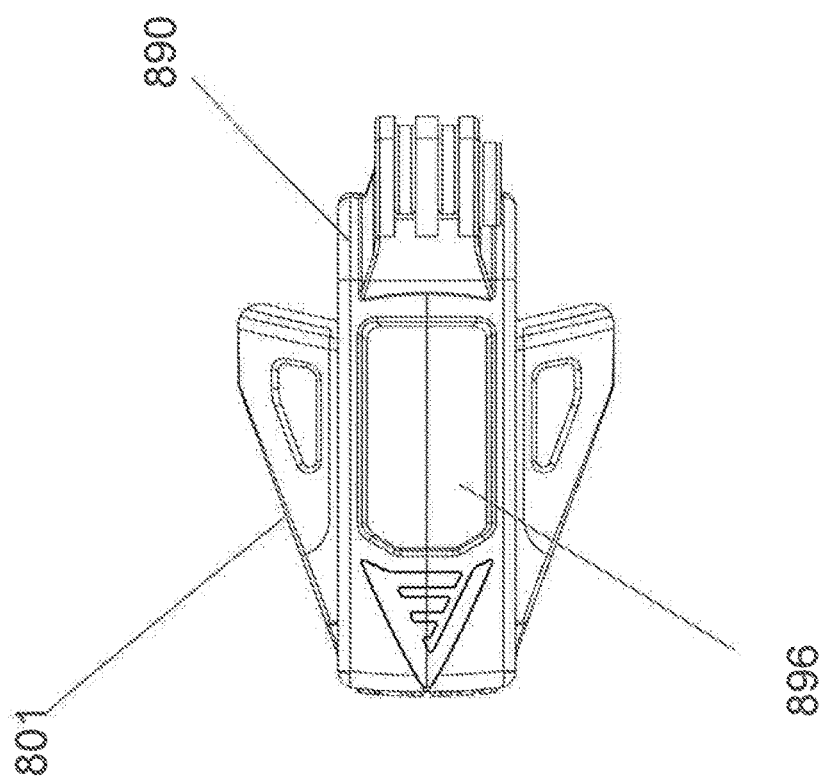
FIG. 35 is a top plan view of an embodiment of a clip system including a body with adjoined end piece. The clip body includes battery compartment.

In an alternative embodiment, any of the clip or clip bodies described herein can include a battery compartment to hold a battery that can power either or both of the indicators mentioned herein or the accessory mounted on the clip. In this respect, FIG. 35 is a top plan view of an embodiment of a clip system including a body 801 with adjoined end piece 890. The clip body includes battery compartment 896, which is sized and shaped to hold a battery. In the case where the battery powers the indicators on the clip or clip body, compartment 896 would include electric wires or conduit to achieve electrical communication between batteries held in compartment 896 and the indicators. In the case where the battery powers the accessory on the clip or clip system, compartment 896 would include electric wires or conduit leading to a plug-in point that would allow the accessory to plug into and be supplied by the battery source held in compartment 896.

While the embodiments of the method and system of the present invention have been described herein, numerous modifications, alterations and changes to the described embodiments are possible without departing from the scope of the invention. The embodiments described herein are not intended to be limiting. In particular the various enhancements such as the microphone mounting feature, the interchangeable device mounting structure and the interchangeable sizing insert can be incorporated separately or additively with the various described embodiments.

The invention claimed is:

1. A system for interchangeable mounting of accessory devices on a hat brim, the system comprising:
   a clip body and one or more end-pieces;
   the clip body comprising a first panel and a second panel, the first and second panels respectively having a length, width, top surface, bottom surface, proximal end and distal end;
   the first panel and second panel each resiliently connected at their distal ends to a nose segment;
   the nose segment having a front-facing surface and a brim-facing surface;
   the second panel having a wedge shaped portion in which the width of the panel increases from the distal end of the panel to the proximal end of the panel;
   the bottom surface of the first panel being concave;
   the top surface of the second panel being convex;
   the proximal end of the first panel including a first attachment structure; and
   the one or more end-pieces including a second attachment structure sized and shaped for releasable attachment to the first attachment structure and an accessory device mounting structure sized and shaped to releasably secure an accessory device.

2. The system of claim 1 wherein a portion of the top surface of the second panel is texturized.

3. The system of claim 1 wherein the width of second panel at its proximal end is 1.5 to 2.5 times the width of the first panel at its proximal end.

4. The system of claim 1 wherein the brim facing surface of the nose segment is concave.

5. The system of claim 1 wherein the distal end of the second panel includes a channel in the top surface of the second panel, the channel having a floor and a sidewall.

6. The system of claim 1 wherein the wedge-shaped portion of the second panel is formed by a pair of flaring side segments, each of which connects to a distal segment at an obtuse angle.

7. The system of claim 1 wherein the accessory device mounting structure includes a positioning stop allowing a user to preset a position of the accessory device on the clip body.

8. The system of claim 1 further including a tab depending from the second panel and providing a vertical surface upon which a user's thumb or finger can push against to remove the clip body from the hat brim.

9. The system of claim 1 further including a tab depending from the second panel;
the tab having a vertical surface and the vertical surface of the tab including one or more indicators; and
the one or more indicators being part of an electronic receiving circuit in wireless communication with an accessory device secured to the accessory device mounting structure.

10. The system of claim 1 wherein the clip body includes a microphone/jack mount, the microphone/jack mount sized and shaped to releasably hold a microphone/jack in wired or wireless electrical communication with an accessory device secured to the accessory device mounting structure.

11. The system of claim 10 wherein the microphone/jack mount connects to the bottom surface of the second panel.

12. A clip body for interchangeable mounting of accessory devices on a hat brim, the clip body comprising:
a first panel and a second panel, the first and second panels respectively having a length, width, top surface, bottom surface, proximal end and distal end;
the first panel and second panel each resiliently connected at their distal ends to a nose segment;
the nose segment having a front-facing surface and a brim-facing surface;
the second panel having a wedge shaped portion in which the width of the panel increases from the distal end of the panel to the proximal end of the panel;
the bottom surface of the first panel being concave;
the top surface of the second panel being convex; and
the proximal end of the first panel including a first attachment structure sized and shaped to releasably attach to a complementary second attachment structure connected to an end-piece that includes an accessory device mounting structure.

13. The clip body of claim 12 wherein the clip body includes a microphone/jack mount, the microphone/jack mount sized and shaped to releasably hold a microphone/jack in wired or wireless electrical communication with an accessory device mounted on the accessory device mounting portion.

14. The clip of claim 13 wherein the microphone/jack mount connects to the bottom surface of the second panel.

15. The clip body of claim 14 wherein the clip body further includes a wire-holding means to releasably secure a wire leading from an accessory device mounted on the clip to the microphone/jack held by the mount.

16. A system for mounting accessory devices on a hat brim, the system comprising:
a clip body and an insert;
the clip body comprising a top body panel and a bottom body panel, the top body panel and bottom body panel respectively having a length, width, inner surface, outer surface, proximal end and distal end;
the top body panel and bottom body panel each being connected at their distal ends to a body nose segment;
the top body panel and bottom body panel having and defining an intra-panel spacing between them;
the body nose segment having an inner surface and an outer surface;
the bottom body panel having a wedge shaped portion in which the width of the bottom body panel increases from the distal end of the panel to the proximal end of the panel;
the inner surface of the top body panel being concave;
the inner surface of the bottom body panel being convex;
the outer surface of the top body panel at the proximal end of the top body panel including structure sized and shaped for receiving an accessory device; and
the insert being sized and shaped so as to be received by the clip body so as to reduce the intra-panel spacing between the top body panel and bottom body panel.

17. The system of claim 16 wherein the insert includes an insert first panel and when the insert is received by the clip body, the insert first panel is engaged by and contacts the inner surface of the top body panel.

18. The system of claim 17 wherein the insert further includes an insert nose segment connected to the insert first panel, the nose segment being sized and shaped such that when the insert is received by the clip body the insert nose segment contacts the inner surface of the nose segment of the clip body.

19. The system of claim 18 wherein the width of body bottom panel at its proximal end is 1.5 to 2.5 times the width of the body top panel at its proximal end.

* * * * *